United States Patent
Opsitos, Jr. et al.

(10) Patent No.: US 8,707,839 B2
(45) Date of Patent: Apr. 29, 2014

(54) MITER SAW HAVING A WORKPIECE ADJUSTING MECHANISM

(75) Inventors: Robert J. Opsitos, Jr., Felton, PA (US); Warren A. Ceroll, Owings Mills, MD (US); James P. Bascom, Bel Air, MD (US); Rick J. Heavel, Hanover, PA (US); Craig A. Schell, Street, MD (US); Robert S. Gehret, Hampstead, MD (US)

(73) Assignee: Black & Decker Inc., Newark, DE (US)

( * ) Notice: Subject to any disclaimer, the term of this patent is extended or adjusted under 35 U.S.C. 154(b) by 842 days.

(21) Appl. No.: 12/385,867

(22) Filed: Apr. 22, 2009

(65) Prior Publication Data

US 2009/0260495 A1     Oct. 22, 2009

Related U.S. Application Data

(60) Provisional application No. 61/071,334, filed on Apr. 22, 2008.

(51) Int. Cl.
*B26D 7/06* (2006.01)
*B23Q 16/00* (2006.01)

(52) U.S. Cl.
USPC ............................................. 83/445; 83/474

(58) Field of Classification Search
USPC .......... 83/432, 436.1, 436.3, 445, 474, 425.3, 83/471.3, 490, 581
See application file for complete search history.

(56) References Cited

U.S. PATENT DOCUMENTS

| | | | |
|---|---|---|---|
| 189,613 A * | 4/1877 | Dicey | 83/425.3 |
| 3,866,502 A * | 2/1975 | Brewer, Sr. | 83/477.2 |
| 4,660,449 A * | 4/1987 | LeTarte | 83/261 |
| 4,756,220 A | 7/1988 | Olsen et al. | |
| 5,088,364 A * | 2/1992 | Stolzer | 83/43 |
| 5,730,434 A | 3/1998 | Schoene et al. | |
| 2004/0089123 A1* | 5/2004 | Lavoie | 83/284 |
| 2005/0120840 A1* | 6/2005 | Koskovich | 83/13 |
| 2006/0219073 A1* | 10/2006 | Urmson | 83/469 |
| 2007/0251366 A1 | 11/2007 | Dawley | |
| 2008/0009961 A1 | 1/2008 | Dick et al. | |

OTHER PUBLICATIONS

European Search Report dated Aug. 1, 2011 issued in corresponding European Application No. 09158452.4.

* cited by examiner

*Primary Examiner* — Stephen Choi
(74) *Attorney, Agent, or Firm* — Harness, Dickey & Pierce, P.L.C.

(57) ABSTRACT

A workpiece adjusting mechanism for a miter saw is provided. The workpiece adjusting mechanism may include: a table for supporting a workpiece to be cut by the miter saw; an engager for engaging the workpiece, the engager configured to move the workpiece with respect to the table; and an actuator configured to control the engager to move the workpiece with respect to the table.

23 Claims, 23 Drawing Sheets

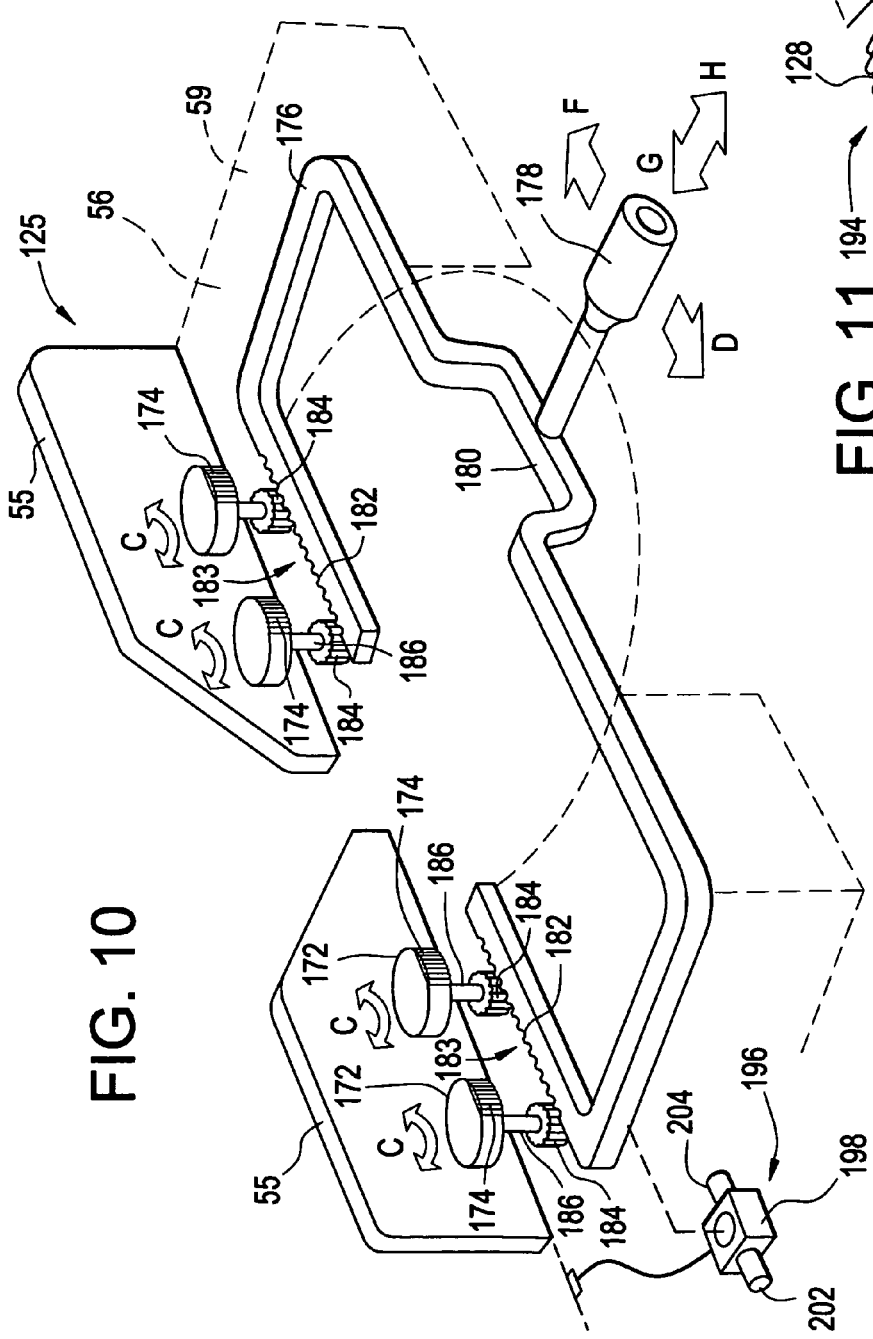

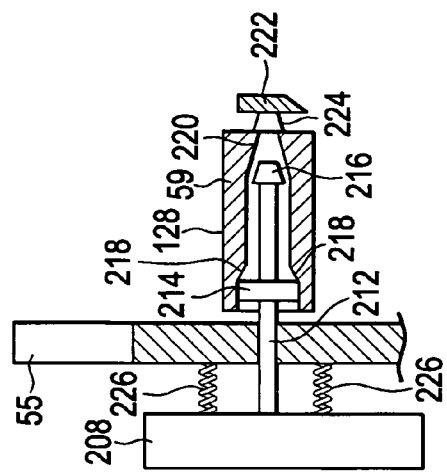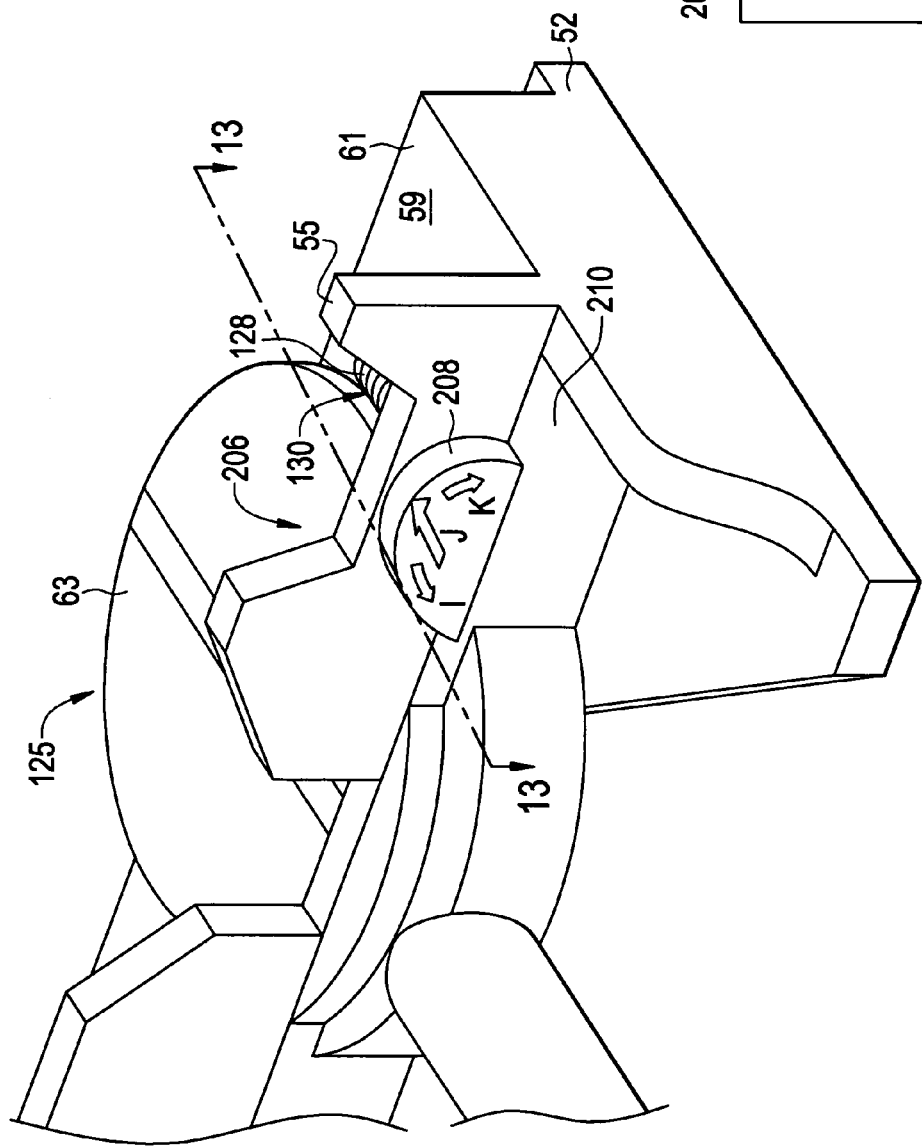

MITER SAW HAVING A WORKPIECE ADJUSTING MECHANISM

CROSS-REFERENCE TO RELATED APPLICATIONS

This application claims the benefit of U.S. Provisional Application No. 61/071,334 filed on Apr. 22, 2008. The disclosure of the above application is incorporated herein by reference in its entirety.

FIELD OF THE INVENTION

The present invention relates generally to adjusting the position of a workpiece with respect to a tool. More particularly, the present invention relates to a method and apparatus for adjusting the position of a workpiece on a miter saw allowing a user to adjust the workpiece in position before cutting the workpiece.

BACKGROUND OF THE INVENTION

Tools such as power miter saws are often used to perform cuts in precise places on a workpiece. The workpiece may be wood, aluminum, plastic, PVC or a variety of materials that may be cut by a powered circular saw. A common workpiece used in miter saws is wood trim. However, a variety of different things may be cut with a miter saw.

Many miter saws are adjustable on at least two axes allowing them to make both miter cuts and bevel cuts. Because of the degree of precision often desired when making such cuts, the position of the workpiece can be important in order to achieve a desired cut. An operator of a power miter saw may use a variety of devices in order to determine where a cut is going to occur. For example, some miter saws have guidance systems which display a laser over a part of the workpiece that will be cut when the blade is lowered. If it is apparent to the operator of the saw that the workpiece is not in the exact position to achieve a cut in a desired place, the operator will then move the workpiece in the desired position and then resight where the cut will be using guides such as a laser guide or other guiding systems or techniques to determine if the workpiece has been moved to the desired position. In other instances, a small test cut is made and then the workpiece is moved a small amount to improve the accuracy of the cut.

The workpiece itself may be a little bit large, bulky, and not always easy to work with as far as adjusting it to move a relatively small amount. Often an operator of a miter saw has one hand holding the handle of the saw and the other hand holding the workpiece. If the workpiece needs to be moved, and if two hands are required to move the workpiece, the operator will let go of the saw and reposition the workpiece, then reposition a hand back on the miter saw handle.

Some guide systems such as laser guides may be actuated by an operator's hand on the miter saw. By removing an operator's hand from the miter saw in order to reposition the workpiece, the laser may turn off, thus causing the operator to have to reposition the workpiece without the benefit of the laser guide. Thus, with some miter saws positioning the workpiece may be an iterative process where the operator must use a guide system and reposition the workpiece several times before the workpiece is in a desired position. Such an iterative process can be time consuming and may at times lead to an imprecise cut.

Accordingly, it is desirable to provide a method and apparatus that can, in some embodiments in accordance with the invention, allow a workpiece to be moved on a miter saw without necessarily causing the repositioning of an operator's hands from a cutting position (i.e. one hand securing the workpiece and the other hand holding the handle of the miter saw).

It is also desirable in some embodiments to provide a method and apparatus that permits the workpiece to be moved on a miter saw while a guiding system such as a laser guiding system is engaged thus allowing an operator of the miter saw to determine when the workpiece is in a desired position and leave the workpiece in the desired position once it is determined to be correctly positioned.

It is further desirable, in some embodiments, to provide a method and apparatus to move a workpiece with respect to a saw blade to put the workpiece in a desired position.

SUMMARY OF THE INVENTION

The foregoing needs are met, to a great extent, by the present invention, wherein in one aspect an apparatus and method is provided that in some embodiments in accordance with the invention, allow a workpiece to be moved on a miter saw without necessarily causing the repositioning of an operator's hands from a cutting position (i.e. one hand securing the workpiece and the other hand holding the handle of the miter saw). Some embodiments in accordance with the invention provide a method and apparatus that permits the workpiece to be moved on a miter saw while a guiding system such as a laser guiding system is engaged thus allowing an operator of the miter saw to determine when the workpiece is in the desired position and leave the workpiece in the desired position in order to cut the workpiece. It is further desirable, in some embodiments, to provide a method and apparatus to move a workpiece with respect to a saw blade to put the workpiece in a desired position.

In accordance with one embodiment of the present invention, a workpiece adjusting mechanism for a miter saw is provided. The workpiece adjusting mechanism may include: a table for supporting a workpiece to be cut by the miter saw; an engager for engaging the workpiece, the engager configured to move the workpiece with respect to the table; and an actuator configured to control the engager to move the workpiece with respect to the table.

In accordance with another embodiment of the present invention, a workpiece adjusting mechanism for a miter saw is provided. The workpiece adjusting mechanism may include: a table for supporting a workpiece, the table movable with respect to a cutting plane defined by a saw blade associated with the miter saw; an actuator attached to the table and configured when actuated to move the table with respect to the cutting plane wherein when the table moves, the workpiece supported by the table also moves with respect to the cutting plane.

In accordance with another embodiment of the present invention, a workpiece adjusting mechanism for a miter saw is provided. The workpiece adjusting mechanism may include: a table having a top surface for supporting a workpiece to be cut by the miter saw, the table having a plurality of holes in the surface of the table; a blower configured to blow air through the holes to suspend a workpiece above the surface of the table; and an actuator configured to turn on and off the blower.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 10 is a partial perspective view of a miter box table assembly in accordance with another embodiment of the invention.

FIG. 11 is a partial perspective view of a roller assembly for a miter block saw table assembly in accordance with another embodiment of the present invention.

FIG. 12 is a partial perspective view of a miter box table assembly in accordance with another embodiment of the invention.

FIG. 13 is a partial cross-sectional view of the embodiment illustrated in FIG. 12 taken along the line 13.

DETAILED DESCRIPTION

Figure 1:
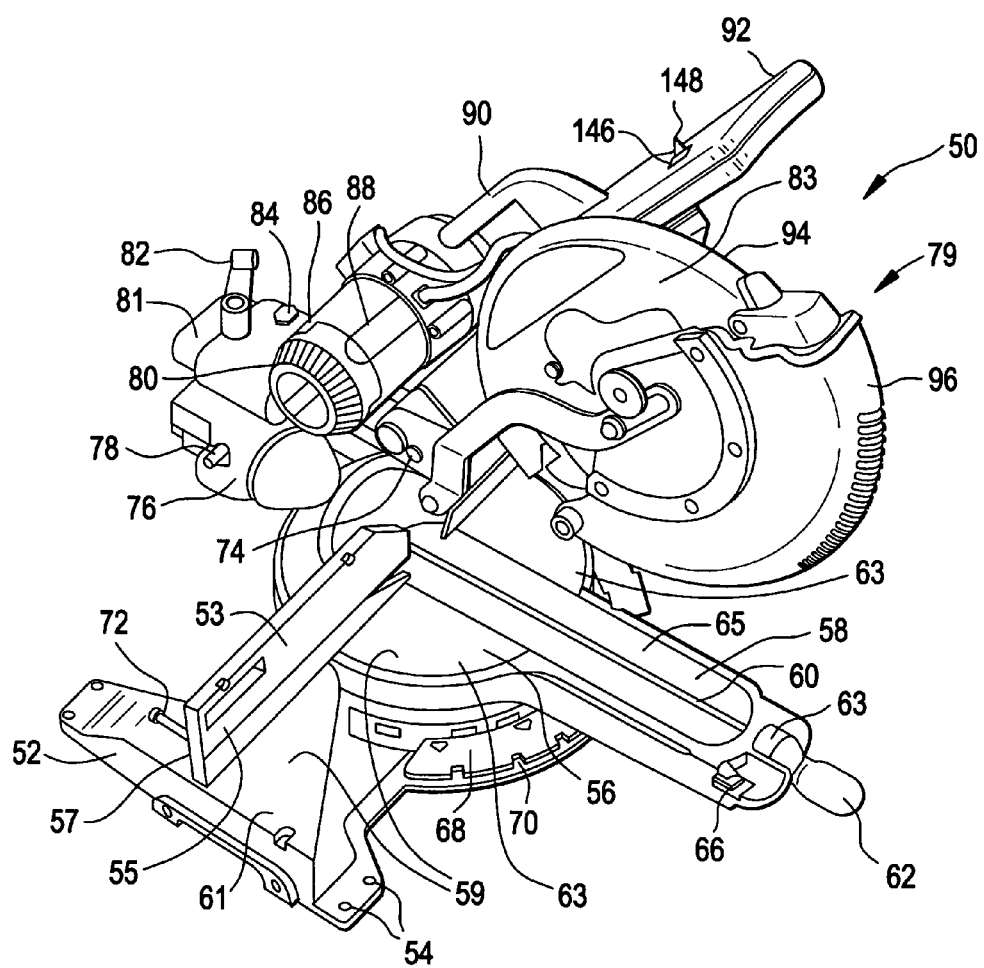
FIG. 1 is a perspective view illustrating a miter saw that may be equipped with apparatus according to an embodiment of the invention.

The invention will now be described with reference to the drawing figures, in which like reference characters refer to like parts throughout. An embodiment in accordance with the present invention provides a miter saw 50. A miter saw 50 includes a frame 52. The frame 52 has bench mounting holes 54. The bench mounting holes 54 assist in mounting the miter saw 50 to a work bench or table where bolts or screws can be extended through the bench mounting holes 54 to secure the miter saw 50 to the bench or table.

The miter saw 50 also has a fence 55 located on a table 56. The table 56 has a relatively flat portion upon which a workpiece can be set for being cut by the miter saw 50. The fence 55 defines a generally vertical surface 53 while the table 56 defines a generally horizontal surface 59. The two surfaces 53, 59 are useful for locating a workpiece for cutting.

The fence 55 has a fence clamp knob 57 which can be loosened to adjust the fence along a horizontal position. Once the fence 55 is in a desirable position the fence clamp knob 57 can be tightened to secure the fence 55 in the desired position.

The table 56 includes a kerf plate 58. The kerf plate 58 includes or defines a slot 60. The slot 60 permits the saw blade to extend below the horizontal surface 59 of the table 56 without damaging the blade. The table 56 includes a stationary part 61 of the table 56 located on the outer periphery of the table 56 and is fixed with respect to the frame 52. The table 56 also includes a rotating part 63 of the table 56 that can be rotated with respect to the frame 52 as will be described in more detail below.

A miter lock handle 62 is mounted to the miter arm 65 on the rotating part 63 of the table 56. The miter lock handle 62 can be actuated to unlock the miter table 63 so that the miter table 63 can be rotated to a desired position. A miter latch override 66 is also provided on the miter arm 65. The miter latch override 66 allows the miter arm 65 to easily move past the common stop angles which may have detents 70 associated with them.

A miter scale 68 is located on the frame 52 and may be useful in selecting a position to rotate the miter arm 65. The miter scale 68, according to some embodiments of the invention, may have detents 70 which will allow the miter arm 65 to stop and "click" into place at various positions (often at common stop angles) along the miter scale 68.

As shown in FIG. 1 some embodiments of the invention include a miter saw 50 that is included with a blade wrench 72. Some embodiments of the miter saw 50 may also include a lockdown pin 74 and a bevel scale 76. The bevel scale 76 may be useful in allowing a user to determine a position to adjust the miter saw 50 when selecting a bevel angle. Bevel latch levers 78 and a bevel lock handle 82 can be articulated to allow the circular saw 83 to be beveled. In some embodiments of the invention, the circular saw 83 may be beveled 48 degrees left or right. The circular saw 83 may include two bevel latch levers 78, one on either side of the rear support housing 81.

In some embodiments of the invention, only one of the bevel latch levers 78 needs to be moved to bevel the circular saw 83 in either direction. The bevel lock handle 82 is on top of the rear support housing 81. In some embodiments of the invention, to bevel the circular saw 83 the bevel lock handle 82 is loosened and one of the bevel latch levers 78 may be lifted approximately 45 degrees and then the circular saw 83 may be beveled to the desired angle as indicated on the bevel scale 76. The bevel lock handle 82 is then locked in place to lock the saw 83 in place. The bevel latch levers 78 may be lifted vertically to override any detents at common stop angles located along the bevel scale 76. A rail lock knob 84 may also be located on the rear support housing 81 along with a rail set screw adjustment 86.

The circular saw 83 may include a motor housing 88 and a lifting handle 90 for lifting the entire miter saw 50. An operating handle 92 is provided to permit the circular saw 83 portion of the miter saw 50 to be raised and lowered in order to make miter cuts. The actual cutting blade itself may be protected by a saw blade housing 94 and a saw blade guard 96.

Figure 2:
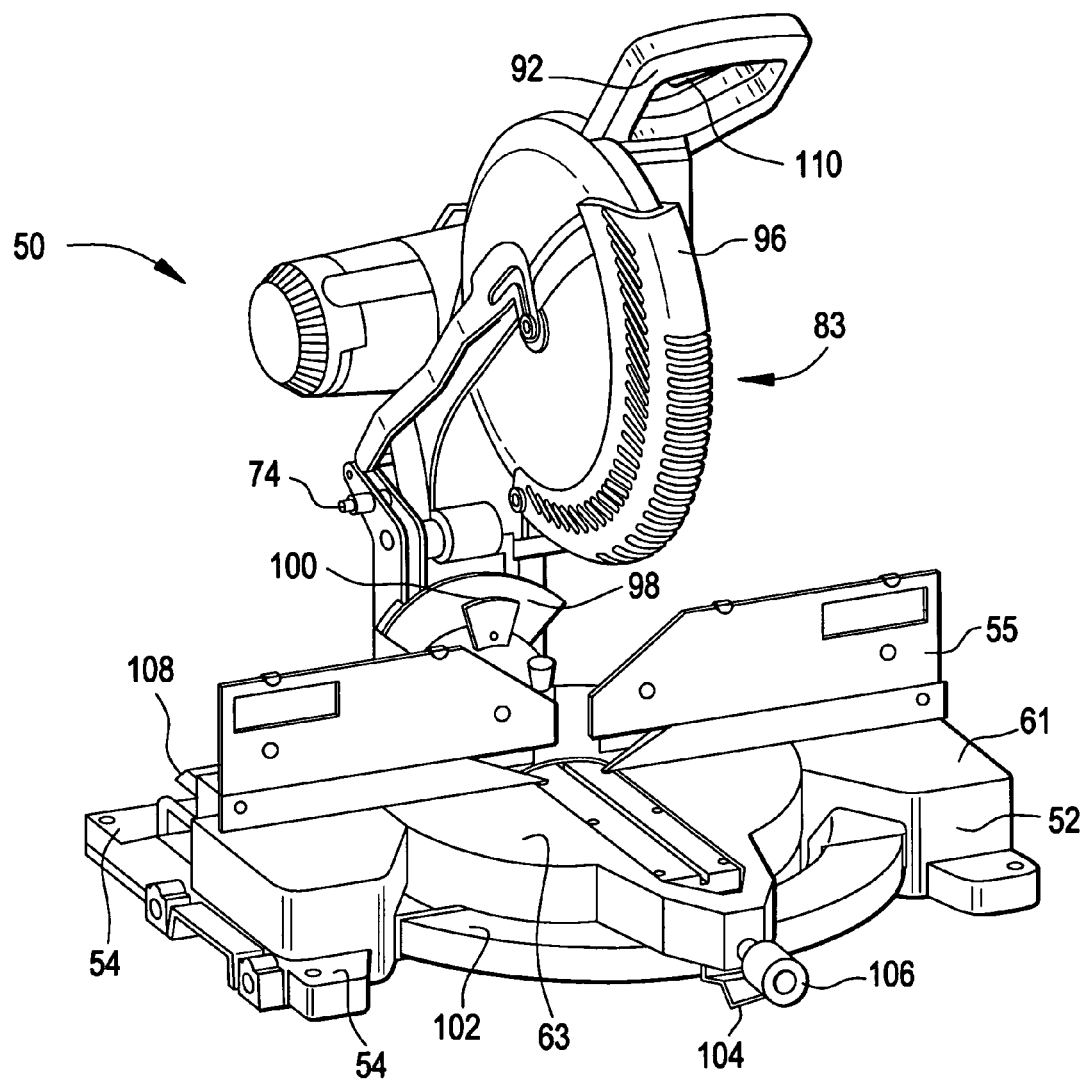
FIG. 2 is a perspective view of a second type of miter saw that may be modified or equipped with apparatus in accordance with an embodiment of the invention.

Other embodiments of the invention may include miter saws 50 that may have a slightly different lay out. For example, a second miter saw 50 is shown in FIG. 2. In the miter saw 50 illustrated in FIG. 2, a bevel scale 98 is located under the circular saw 83 and includes a bevel scale indicator 100. Also, the miter scale 102 is located on the frame 52 but instead of having a miter lock handle 62 as shown in FIG. 1, the miter saw 50 as shown in FIG. 2 includes a miter latch 104 and a miter clamp lock 106. It also has a fence clamp knob 108. The operating handle 92 includes a trigger switch 110 which may be common to many types of miter saws 50, not just those shown in the FIGS.

Figure 3:
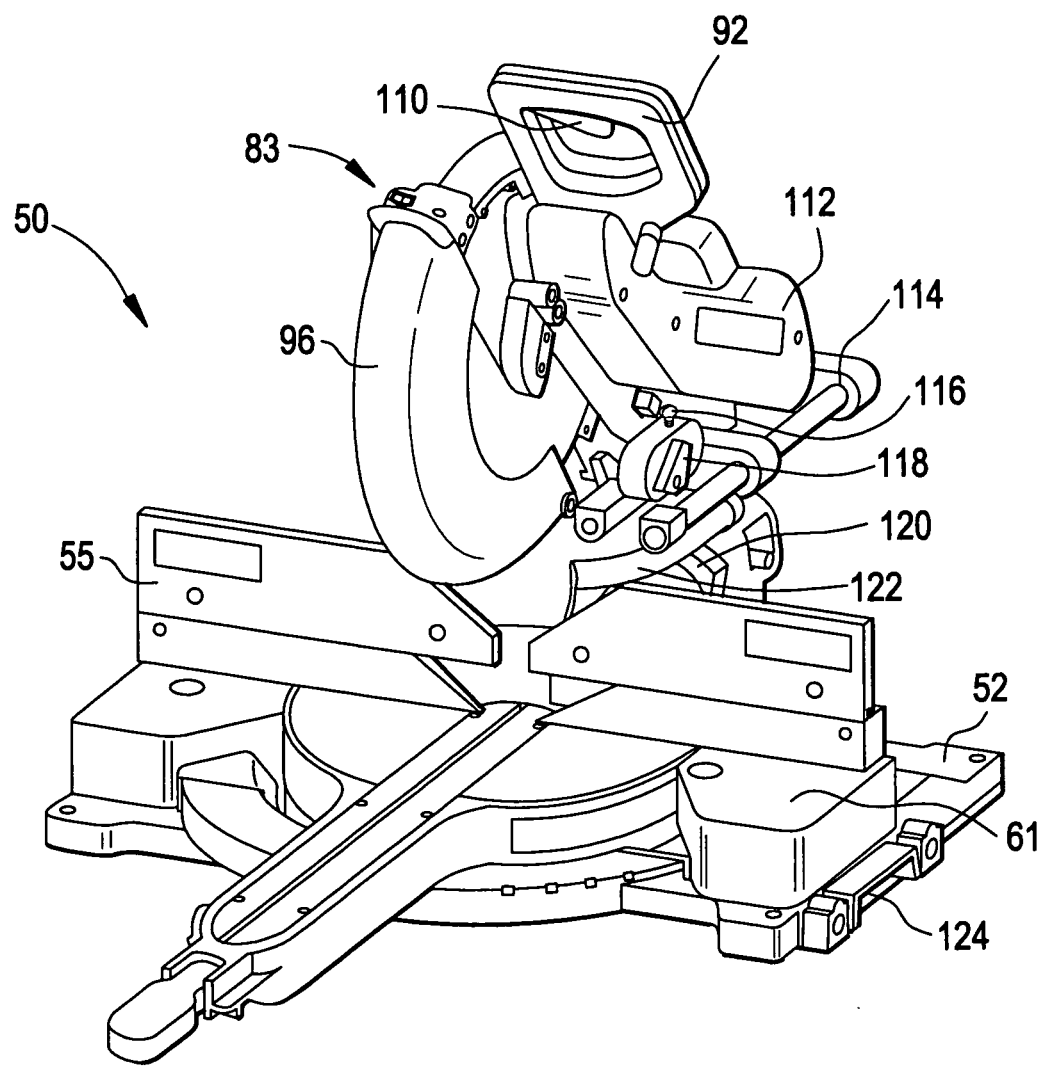
FIG. 3 is a perspective view of the miter saw shown in FIG. 1 taken at a different angle than that shown in FIG. 1.

Turning now to FIG. 3, the miter saw 50 illustrated in FIG. 1 is shown from a different angle to illustrate additional components. The operating handle 92 includes a trigger switch 110. A belt cover 112 is also illustrated. The circular saw 83 is mounted upon rails 114 and includes a thumb screw 116 to allow adjustment along the rails 114. A grooving stop 118 is provided.

As shown in FIG. 3, the miter saw 50 includes bevel latch plates 120 and a dust spout 122 where, in optional embodiments of the invention, dust can be collected in order to assist in keeping a working area clear of sawdust.

A hand indention 124 is located in the frame 52 in order to assist in moving the frame 52 to a desired position upon a table or workbench prior to being secured to the table or workbench. The hand indention 124 may also be useful whenever preparing to move the miter saw 50.

Figure 4:
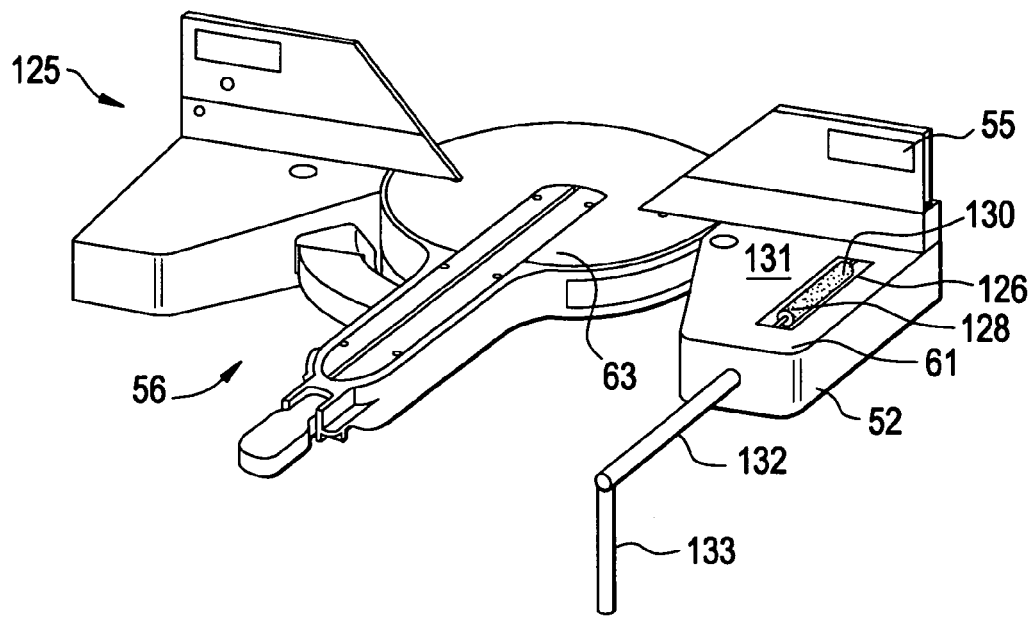
FIG. 4 is a perspective view of a portion of a miter saw table in accordance with an embodiment of the invention.

Turning now to FIG. 4, a table assembly 125 for a miter saw 50 in accordance with one embodiment of the invention is shown. The table assembly 125 includes a rotating part 63 of the table 56 and the stationary part 61 of the table 56. An opening 126 is provided in the stationary part 61 of the table 56 for a roller 128. The roller 128 provides a means to allow a workpiece to be moved laterally across the table 56. Optionally, the roller 128 can include a high friction surface 130. The high friction surface can be useful to enable a workpiece to be moved when the roller 128 rotates rather than having the roller 128 spin against the workpiece. Some examples of the high friction surface 130 can include a sand paper type surface or a resilient type surface such as rubber. Any other suitable type surface may also be used.

Figure 8:
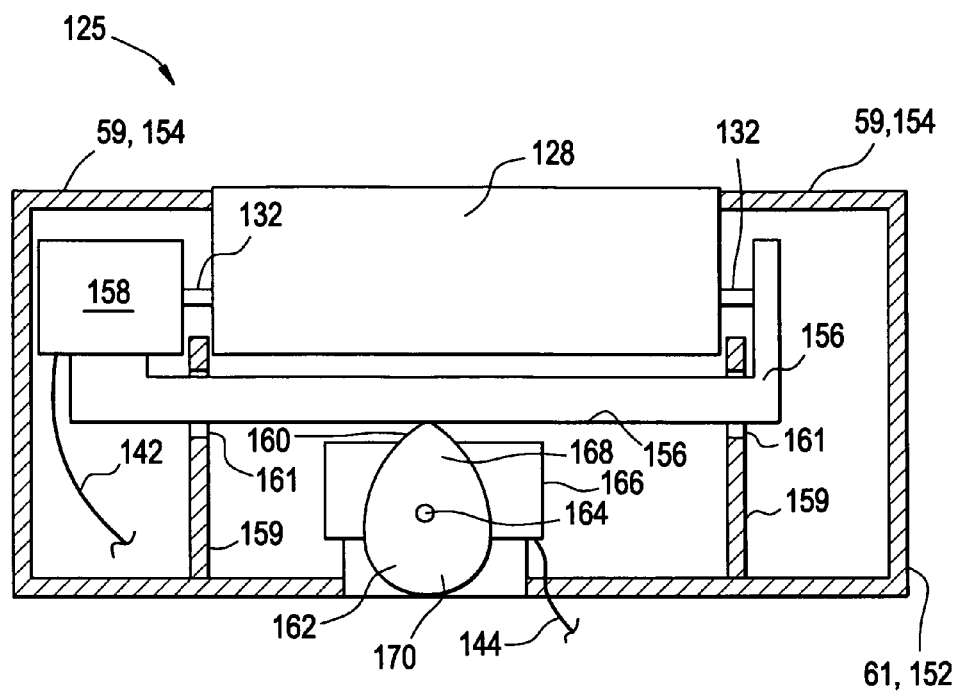
FIG. 8 is a partial cross-sectional view of a miter saw in accordance with the invention having a roller assembly in a raised position.
Figure 9:
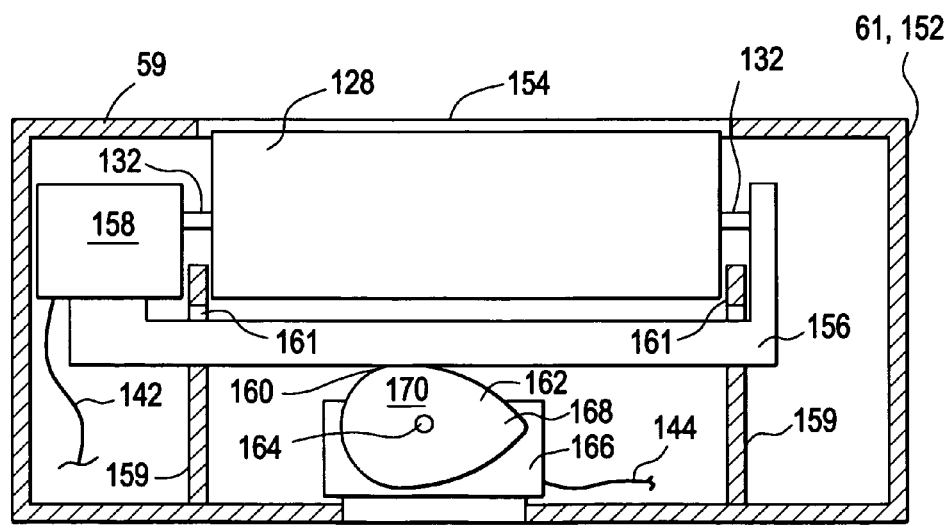
FIG. 9 is a partial cross-sectional view of the embodiment shown in FIG. 8 where the roller is in a lowered position.

The roller 128 is mounted to a roller shaft 132 (See also, for example, FIGS. 8 and 9.) The roller shaft in some embodiments of the invention may serve as an axle for the roller 128.

A lever handle 133 is used to rotate the roller shaft 132 and therefore rotate the roller 128. The lever handle 133 can be operated by an operator's knee or leg and alternatively could be operated by the operator's hands.

One advantage of having the lever handle 133 operated by an operator's knee or leg is that if an operator is busy with one hand on the operating handle 92 and the other hand is busy securing a workpiece onto the table assembly 125, and it is desired to move the workpiece a small amount laterally to the right or to the left the operator can use the operator's knee or leg to turn on the lever handle 133 clockwise or counterclockwise. Turning the lever handle 133 will roll the roller 128 clockwise or counterclockwise (depending on which way the lever handle 133 is turned) which would then move the workpiece either to the right (when the roller 128 and lever handle 133 is turned clockwise) or to the left (when the roller 128 and lever handle 133 is turned counterclockwise) on the table assembly 125.

It will be appreciated that in some embodiments of the invention that the workpiece will rest against the fence 55 and the horizontal surface 59 of the table 56. The roller 128 can be dimensioned so that it rises only slightly above the table surface 59 in order for the high friction surface 132 to engage the workpiece in order to move the workpiece to the right or to the left.

In some embodiments of the invention, it may be desirable to take care to ensure that the roller 128 does not protrude to far above the surface 59 in order to avoid the workpiece from not contacting the surface 59 but rather merely only contacting the roller 128. Such a condition may in some embodiments cause the workpiece to rock on the table 56 rather than being held steady during a cutting operation.

Figure 5:
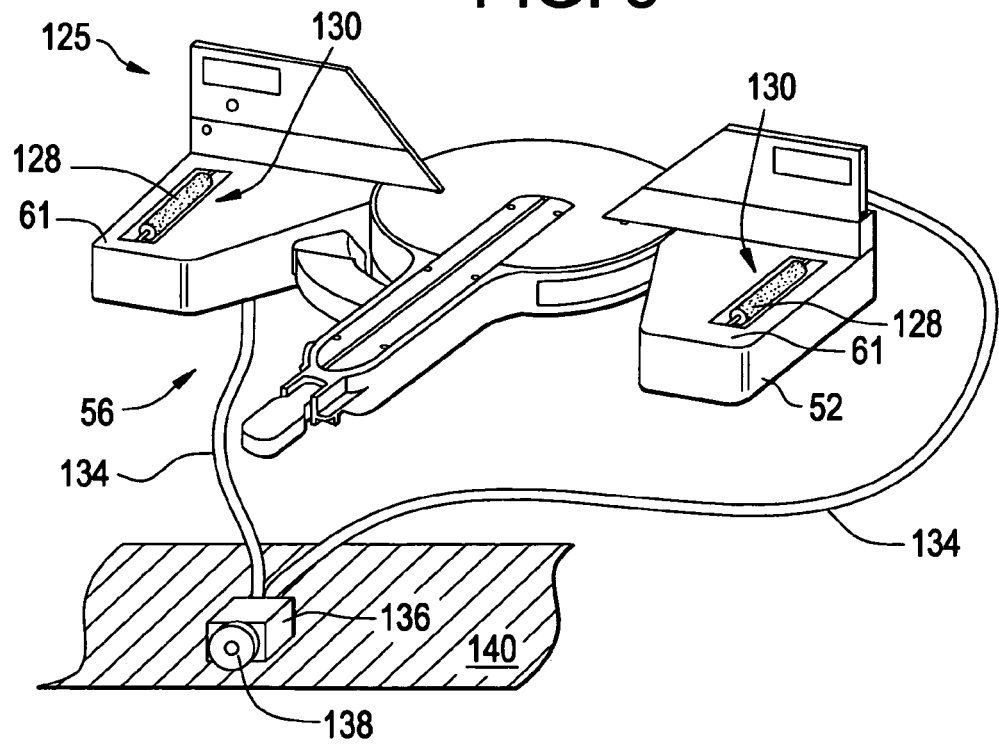
FIG. 5 is a perspective view of a portion of a miter saw table in accordance with another embodiment of the invention.

FIG. 5 illustrates another example of a table assembly 125 in accordance with an embodiment of the invention. The table assembly 125 shown in FIG. 5 has two rollers 128, both located in the stationary parts 61 of the table 56. Again, the rollers 128 may be equipped with a high friction surface 130. The rollers 128 may be mounted within the stationary portion of the table 61 on axles 132 (See, for example, FIGS. 8 and 9) which will permit them to roll. The rollers 128 may be located and dimensioned as described with respect to FIG. 5 to allow the rollers 128 to engage the workpiece enough to be able to move it laterally along the table 56 as desired.

As shown in FIG. 5 the rollers 128 are operatively connected to control cables 134. The control cables 134 may be flexible and configured to transmit a mechanical movement and may be Bowden-type cables or any other cable capable of transmitting mechanical movement.

The control cables 134 are operatively connected to a control box 136 having a actuator 138. In some embodiments of the invention, the actuator 138 may be a circular actuator 138 and may be actuated by allowing an operator's foot to move the circular actuator 138 clockwise or counterclockwise. In some embodiments of the invention moving the circular actuator 138 clockwise will cause the rollers to roll clockwise, thus moving a workpiece mounted on the rollers 128 to the right. Likewise, moving the circular actuator 138 counterclockwise may cause the rollers 128 to move counterclockwise, thus moving a workpiece mounted upon them to the left.

As shown in FIG. 5 the control box 136 with the circular actuator 138 may be, in some embodiments of the invention, mounted on a floor 140 and located to permit an operator's foot to actuate the actuator. In other embodiments of the invention, the actuator 138 may be actuated by other parts of the user such as the user's legs or hands. The actuator 138 illustrated is meant to be one example and one skilled in the art after reviewing this disclosure may be able to select a variety of actuators 138 that may be useful and used in accordance with the invention.

Figure 6:
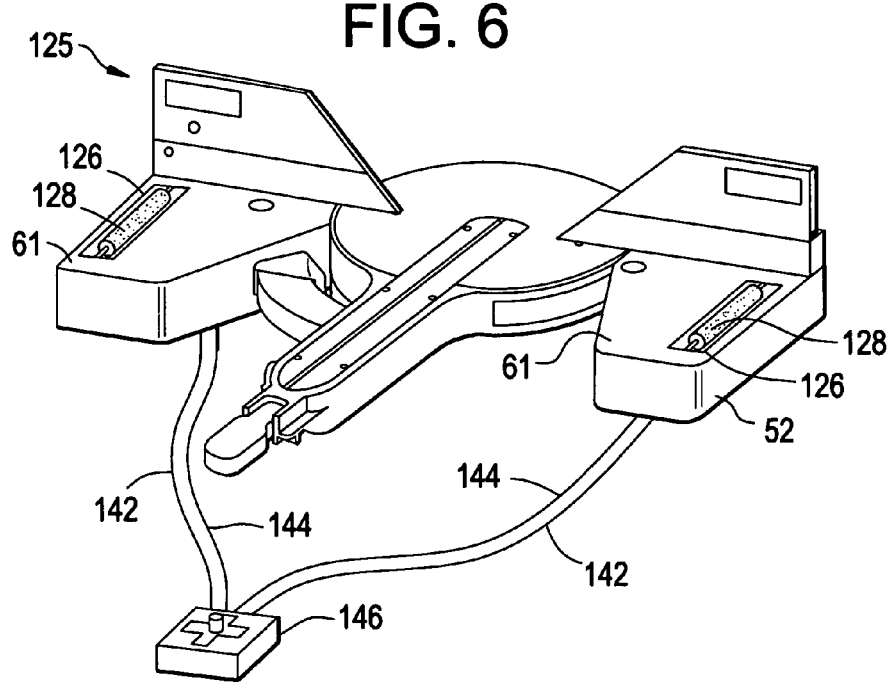
FIG. 6 is a partial perspective view of another embodiment of the invention where the rollers are located in the table portion of a miter saw.

FIG. 6 illustrates another table assembly 125 for a miter saw 50 in accordance with another embodiment of the invention. In the table assembly 125 shown in FIG. 6, rollers 128 are located on each stationary portion 61 of the table 56. The rollers 128 are powered by electric motors which will be described in more detail below. A roller motor control cable 142 and a rising motor controller power cable 144 operatively connect a switch box 146 with a roller motor 158, and cam motor 166. (See, for example, FIGS. 8 and 9).

Figure 7:
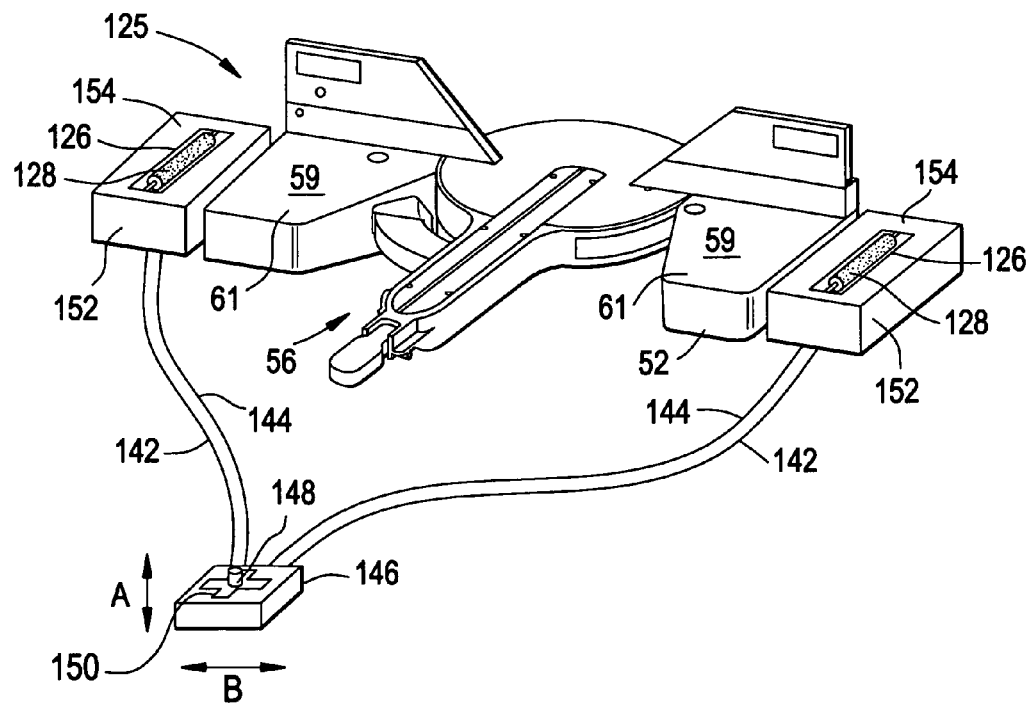
FIG. 7 is a partial perspective view of another embodiment in accordance with the invention having rollers located adjacent to a table portion of a miter saw.

FIG. 7 shows another table assembly 125 for a miter saw 50 according to another embodiment of the invention. As shown in FIG. 7, rollers 128 are contained in roller boxes 152 mounted to the frame 52 outside of the stationary portion 61 of the table 56. The roller box 152 may alternatively be detached from the frame 52. The roller box 152 has a top surface 154 that is substantially even with the top surface 59 of the table 56. Optionally the rollers 128 can include high friction surfaces 130 as described with respect to other embodiments.

The rollers 128 are controlled by a roller motor 158 and a cam motor 156 as will described in more detail below with respect to FIGS. 8 and 9. Control and power cord 142 connects the roller to the switch box 146. Power and control cable 144 connects the rising motor 166 to the switch box 146.

In some embodiments of the invention, the switch box 146 may include a joystick type controller 148 that can move up and down as shown by arrow A and also from side to side as illustrated in FIG. 7 by arrow B. Optionally, the switch box 146 can include an edge 150 which defines or limits the motion of the joystick type controller 148. The switch box 146 may be provided with position-sensitive or pressure-sensitive switches so that the user can modify the rotational speed of the rollers 128 by pressing further on the switch. In some embodiments of the invention, the switch box 146 may be located on the floor 140 to enable an operator to operate the joystick type controller 148 with the operator's foot thus freeing up an operator's hands to operate the miter saw 50. Other embodiments may locate the controller 148 anywhere else including the operating handle 92. (See FIG. 1).

FIGS. 8 and 9 illustrate an example of how a roller 128 may be operatively connected to a roller motor 158 and to a rising and lowering motor 166. In some embodiments of the invention the roller 128 can roll in a clockwise and counterclockwise direction and also can be raised to be above and below the top surface 59 or 154 of either the roller box 152 or the stationary portions 61 of the table 56 depending on whether the roller 128 is installed in a roller box 152 or in the stationary portion 61 of the table 56 as illustrated in either FIGS. 6 of 7.

FIG. 8 is a cross-sectional view of a table assembly 125 in accordance with an embodiment of the invention. The apparatus shown in FIG. 8 and FIG. 9 illustrates an embodiment of the invention where the roller 128 is able to be extended up through the surface 59 or 154 of the stationary part of the table 61 or roller box 152 depending on whether the roller 128 is located in the roller box 152 or the stationary part of the table 61.

While FIGS. 8 and 9 illustrate an example of one type of apparatus that permits the roller 128 to extend up through the top surface 59 or 154 of either the table 56 or roller box 152, it should be understood that other apparatuses that permit the roller 128 to extend up through the top surface 59 or 154 of either the stationary part 61 of the table 56 or the roller box 152 and then retreat down below the surface 59, 154 may also be used in accordance with the invention.

The roller 128 is mounted to an axle 132 that is operatively connected to an electric motor 158. The electric motor 158 is operatively connected via a power/control cable 142 to a controller 146. See, for example, FIG. 7. The motor 158 and the axle 132 are mounted onto a bracket 156. The bracket 156 is moveably mounted to mounting frames 159. The mounting frames 159 have slots 161 which allow the bracket 156 to move up and down according to the position of the cam 162.

The frame 156 includes a camming surface 160. The camming surface 160 is engaged by the cam 162 when the frame 156 is in the raised position as illustrated in FIG. 8. The frame 156 is raised by the elongated portion 168 of the cam 162. The frame 156 can move between the raised position as shown in FIG. 8 and a lowered position shown in FIG. 9.

A motor 166 is operatively connected to the switch box 146 as shown in FIG. 7. The rising motor control/power cable 144 carries the signal between the switch box 146 and the motor 166 to raise or lower the frame 156. To raise the frame 156 the motor 166 turns the cam shaft 164 which thus turns the cam 162 mounted on the cam shaft 164 so that the elongated section 168 is in the upper position as shown in FIG. 8.

When it is desired to lower the frame 156, a signal is sent via the power conduit line 144 to the motor 166 to rotate the cam shaft 164 so that the elongated portion 168 of the cam 162 is rotated to a horizontal position and the standard surface 170 of the cam 162 is engaged with the camming surface 160 of the frame 156. Gravity operates to lower the frame 156 when the elongated portion 168 of the cam 162 rotates to a horizontal position. Raising and lowering the frame 156 will cause the roller 128, axle 132 and motor 158 to be raised or lowered as they are all connected.

While the embodiment that is illustrated in FIGS. 8 and 9 illustrate one way a roller 128 can be raised above the surface 59, 154 or below the surface 59, 154 as desired by a saw operator with a switch box 146, other roller 128 raising and lowering apparatuses may also be employed in accordance with the invention.

In addition to raising the roller 128 and lowering the roller 128, the switch box 164 can also cause the roller 128 to rotate either clockwise or counterclockwise by operating the joystick type controller 148 of the switch box 146. When it is desired to cause the roller 128 to rotate counterclockwise, the joystick 148 is moved to the left as illustrated in FIG. 7 at arrow B. To cause the roller to rotate clockwise the joystick type controller 148 is moved to the right as illustrated in FIG. 7 at arrow B. Movement of the joystick type controller 148 causes the roller motor 158 to rotate the roller 128. The control signal from the switch box 146 is carried via the control/power cable 142 to the motor 158. In some embodiments of the invention, the motor 158 is a high torque motor which causes the roller 128 to move relatively slowly but at a relatively high torque in order to move the workpiece to a desired position.

FIG. 10 is a partial view of a table assembly 125 according to another embodiment of the present invention. The top surface 59 of the table 56 is shown in broken lines in order to see the components located below the top surface 59 of the table 56.

In the embodiment shown in FIG. 10, rollers 172 are located in the fence 55 portion of the table assembly 125. While four rollers 172 are shown, other embodiments of the invention may include any number of rollers including one roller 172. The rollers 172 are configured to rotate either clockwise or counterclockwise as indicated by the arrow C next to each roller. The rollers 172 have a toothed surface 174 which allows the rollers 172 to engage a workpiece mounted on the top surface 59 of the table 156.

The rollers 172 extend through openings 174 in the fence 55. In some embodiments of the invention, the rollers 172 can selectively extend through the openings 174 in the fence 55 and selectively retract through the openings 174 in the fence 55 so that they can selectively engage a workpiece located against the fence 55.

The rollers 172 are operatively connected to a bracket 176. The bracket 176 has a bracket handle 178. The bracket handle 178 can be moved to the right, in the direction of the arrow labeled F, or to the left, in the direction of the arrow labeled D. Moving the bracket handle 178 in the direction of arrow F causes the rollers 172 to rotate counterclockwise, thus causing a workpiece engaged by the rollers 172 to slide in the same direction as pointed by arrow F. Moving the bracket handle 178 in the direction of arrow D will cause the rollers 172 to rotate in a clockwise position, and thus they will move a workpiece that may be engaged with the rollers 172 in the same direction as indicated by arrow D.

In some embodiments of the invention the bracket 176 may include a lowered portion 180 to which the bracket handle 178 is mounted. The lowered portion 180 may be dimensioned in order to allow the miter arm 65 (see, for example, FIG. 1) to not interfere with the bracket 176.

The rollers 172 are controlled by, and interact with, the bracket 176. The bracket 176 includes a rack portion 182 having teeth 183. The teeth 183 interact with the pinion 184 which is mounted on the connecting shaft 186 so when the rack 184 moves the pinion 184 will rotate in the shaft 186 and then in turn rotating the rollers 172. In addition to rack and pinion, other methods such as a roller chain engaging sprocket teeth, a V-belt shape engaging a mating sheave or other suitable systems may be used.

In some embodiments of the invention, a pivoting bearing 196 is deployed to assist in allowing the rollers 172 to selectively extend through the roller opening 174 in the fence 55 and retreat back into the fence 152 selectively. Each roller 172 may be mounted to a pivoting bearing 196. In some embodiments of the invention the connecting shaft 186 extends through the hole 204 in the pivot bearing housing 198. Shafts 200 and 202 assist in the mounting of the pivot bearing 196. Shafts 200 and 202 are oriented perpendicular to the axis of roller 172 in order to move the workpiece parallel to the fence 55 and table 56 and maintain proper engagement of rack 182 and pinion 184.

In some embodiments of the invention the pivot bearing 196 may be spring loaded so as to bias the rollers 172 to be located within the fence 55 and not protrude through the fence roller opening 174. When it is desired to have the rollers 172 protrude through the fence opening 174, the bracket handle 178 is pushed in the direction of arrow G which will engage the rack 182 with the pinion 184 and pivot the shafts 186 in the pivot bearing 196 and cause the rollers 172 to overcome the bias of the pivot bearing 196 and protrude out through the fence roller openings 174. In other embodiments of the invention, the pivot bearings 196 themselves may not be spring biased but the rollers 172 may have a biasing through springs attached to them to bias the rollers 172 to retreat into the fence 152.

According to other embodiments of the invention, the rollers 172 may be operatively connected to the bracket 176 so that when the bracket 176 is moved in the direction of arrow G, the rollers 172 are extended out through the opening 174. When the bracket 176 is moved in the direction of arrow H, the rollers 172 are retracted into the openings 174. In other embodiments the correlation between the direction of bracket 176 movement and roller 172 movement may be reversed.

FIG. 11 shows an alternate embodiment similar to that shown in FIG. 10 where the rollers 128 do not extend through the fence 55 but rather extend through the hole 126 in the table 56. The rollers 128 include an axle 192 connected to a pinion 190 which is engaged with a rack 188 which is located on a bracket 176 as illustrated in FIG. 10. However, the rack 188 is located on a top portion of the bracket 176 rather than a side portion of the bracket 176 as illustrated in FIG. 10.

The operation of the rack 176 and pivot bearing 196 in the embodiment shown in FIG. 11 may operate the same as described with respect to FIG. 10 except the movement of the bracket 176 and bracket handle 178 is changed to be an up and down movement rather than an in and out movement. The pivot bearing 196 orientation may also be shifted 90° to that shown and described with respect to FIG. 10. While the embodiments shown in FIG. 10 and FIG. 11 were described separately, it should be understood that the embodiments may be combined on one saw 50. Thus, in some embodiments a saw 50 may have features shown in both FIGS. 10 and 11.

FIG. 12 and FIG. 13 illustrate another table portion 125 in accordance with the invention. The table portion 125 shown in FIG. 12 illustrates a back or rear portion of the table assembly 125. The table assembly 125 includes the rotating portion 63 and non-rotating portion 61 of the table 56.

The fence 55 includes a cutout portion 206. The cutout portion 206 is dimensioned so that an operator's hand can reach through the cutout portion 206 to engage the rotating disc 208. The rotating disc 208 is operatively connected to a roller 128 located on the non-rotating portion of the table 61. The roller 128 may include a high friction surface 130 as discussed above.

The rotating disc 208 is located on a table area 210 behind the fence 55. Pressing the rotating disc 208 in, as shown, in the direction of arrow J will cause the rotating disc 208 to engage the roller 128. In some embodiments of the invention, the rotating disc 208 does not engage the roller 128 unless a operator reaches through the gap 206 in the fence 55 and engages the rotating disc 208 with the roller 128 by pressing the rotating disc 208 in the direction of arrow J. When the rotating disc 208 is engaged with the roller 128, rotating the rotating disc 208 in the direction of arrow K will cause the roller 128 to rotate in the same direction. Rotating the disc 208 in the direction indicated by arrow I will cause the roller 128 to rotate in that same direction.

FIG. 13 is a partial cross section taken along the line 13 in FIG. 12. FIG. 13 illustrates the rotating disc 208 which is operatively connected via a shaft 212 to a large 214 and small 216 conical rollers. Conical rollers 214 and 216 are located within the roller 128. When the rotating disc 208 is pressed in the direction of arrow J shown in FIG. 12 the rotating disc 208 will move closer to the fence 55 causing the large conical roller 214 to engage a large receiving pocket 218 and the small conical roller 216 to engage the small receiving pocket 220. By the engagement of the large 214 and small 216 conical rollers with the receiving pockets 218, 220, the roller itself 128 will be urged against a bearing surface 22 via a bearing member 224.

When the large conical roller 214 is engaged to the large receiving pocket 218 and the small conical roller 216 is engaged with the small receiving pocket 220 then the roller 218 is operatively connected to the large rotating disc 208 via a friction type connection. In some embodiments of the invention, the movement of the large 214 and small 216 rollers to engage the receiving pockets 218, 220 will cause the roller 128 to raise up from a below surface 59 position to an above surface 59 position. Therefore, in some embodiments pressing in (direction arrow J) of the rotating disc 208 will raise the roller 128 to have its outer edge be above the top surface 59 of the table 56. When the disc 208 is rotated then the roller 128 will also rotate.

Return spring 226 will bias the rotating disc 208 out away from the fence 55, thus causing the large conical roller 214 to disengage from the large receiving pocket 218 and the small conical roller 216 to disengage from the small receiving pocket 220 and, in some embodiments, cause the roller 128 to drop to below the surface 59 of the table 56. Thus, the rotating disc 208 is biased to be disengaged from the roller 128 and the roller 128 is biased to be located below the surface 59 of the table 56. An operator's hand may be placed on the fence 55 and the fingers extend through the gap 206 in the fence and over come the bias of the springs 226 and engage the rotating disc 208 and press the rotating disc 208 in towards the fence 55. The disc 208 will then be mechanically connected to the rollers 128 and the rollers moved to an engaging position above the top surface 59 of the table 56, thereby the operator can operate the roller 128 to cause a workpiece to move on the table 125 to a desired position.

Figure 14:
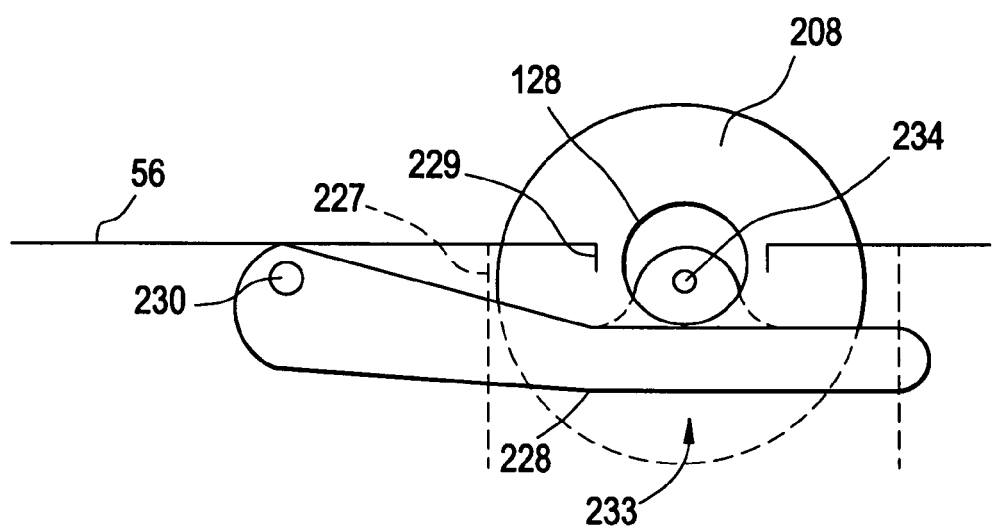
FIG. 14 is a partial side view of a roller assembly in accordance with an embodiment of the invention.

An alternate embodiment to that shown in FIGS. 12 and 13 is shown in FIG. 14. In the embodiment shown in FIG. 14 the roller 128 is mounted in a bearing system 233 that is in turn mounted to a lever 228. The lever 228 is connected to the table 56 via a pivot pin 230. The roller 128 is connected to the lever 228 via an axle 234. The lever 228 is pivally mounted to the table 56. Similar to as shown in FIGS. 12 and 13, the rotating disc 208 is mounted to a common shaft 234 with the roller 128. Turning the disc 208 will cause the roller 128 to turn. The disc 208 is pivotable as it can pivot with the lever 228 because it is mounted to the same axle 234 as the roller 128.

A hole 227 is provided in the table 56 to permit the disc 208 to extend into the table 56. Another hole 229 is provided in the table 56 to permit the roller 128 to move above and below the surface of the table 56 as lever 228 pivots. To raise the roller 128, the user will lift disc 208 to engage the roller 232 with a workpiece and rotate disc 208 to advance the workpiece located on the table 56.

The hole 227 in the table 56 may be dimensioned large enough to permit a users hand to reach through the hole 227 and lift up on and rotate the disc 208. In some embodiments of the invention, to disengage the roller 128 with a workpiece, a user simply lets go of the disc 208 and the disc 208, the roller 128 and lever 228 will fall by the weight of gravity.

Figure 15:
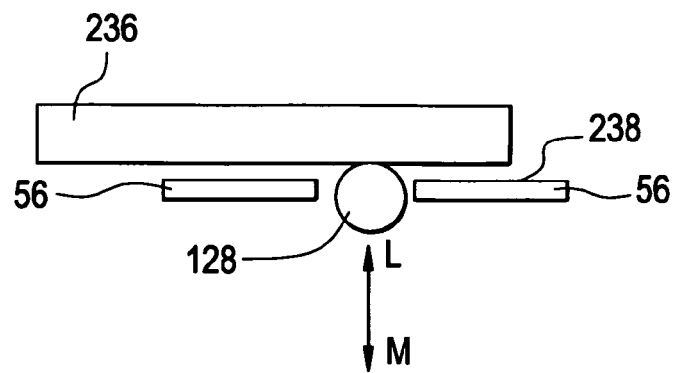
FIG. 15 is a side view of a roller assembly for a miter saw in accordance with the invention.

In another embodiment in accordance with the invention as illustrated in FIG. 15 a table 56 is equipped with one or more non-powered rollers 128. The rollers 128, serve to lower the friction of a workpiece 236 against the table 56. In other words, when the rollers 128 are raised and engaged with the workpiece 236, it is easy for the user to move the workpiece 236.

In contrast, the table 56 has a relatively high friction surface 238. The high friction surface 238 may include a rough finish on table 56 or pads that are similar to sand paper or any other suitable surface coating or finish. When the workpiece 236 rests against the table 56 the workpiece 236 is relatively stable because of the rough surface 238 of the table 56. The roller 128 can be raised up and down as illustrated by arrows L and M. When the roller 128 is in the up position as shown in FIG. 15 a workpiece 236 is raised off of the table 56 and can be easily moved horizontally. When the roller 128 is moved down as shown by arrow M, the workpiece 236 again comes in contact with the high friction surface 238 of the table 56 and is therefore relatively secured in its position. The roller 128 can be moved up and down by a mechanism similar to that shown in FIGS. 8 and 9, or any other suitable mechanism that can move the roller 128 up and down.

Figure 16:
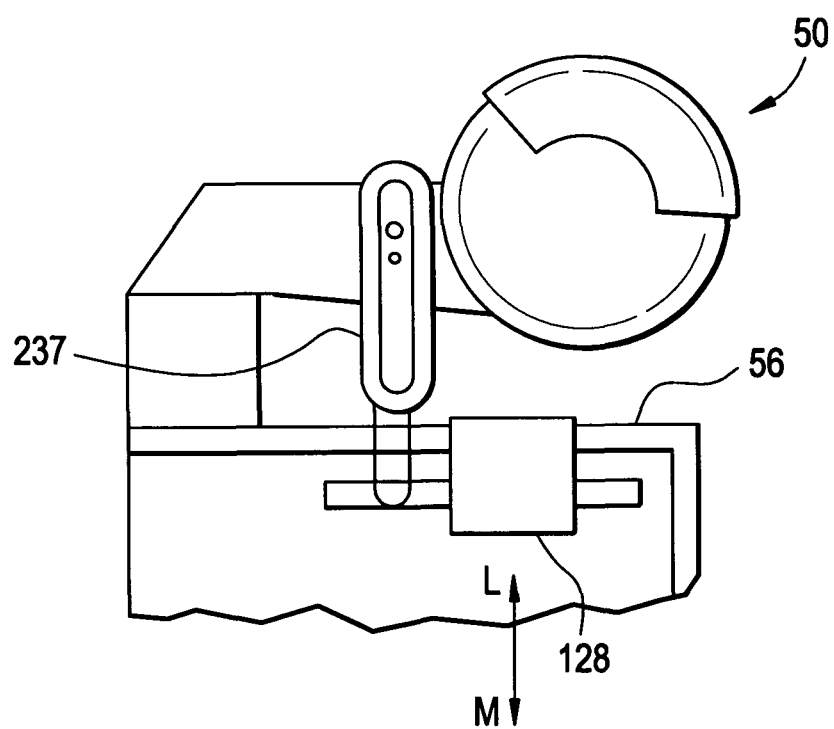
FIG. 16 is a partial side view of a miter saw in accordance with an embodiment of the invention.

FIG. 16 shows a miter saw 50 having an interconnection with a roller 235 as shown in FIG. 15. A linkage 237 between miter saw arm 241 and roller 128 controls the motion of roller 128. Miter saw arm 241 is pivotally attached to saw base 243 and has two basic positions. The arm 241 is up when the user is preparing the workpiece to be cut, and the arm 241 is down when then the user is cutting the workpiece. The linkage 237 provides an interconnection between the arm 241 and roller 128. When the arm 241 is up, roller 128 is also up as to extend through the table 56. The roller 128 engages the workpiece and lifts it, at least in part, off of the surface of the table 56. Once the roller 128 is supporting the workpiece, the user can easily position the workpiece. When the arm 241 is down, or partially down, the roller 128 (or in some embodiments, roller s128) drops beneath table 56. The workpiece is then resting against the high friction surface on table 56.

Figure 17:
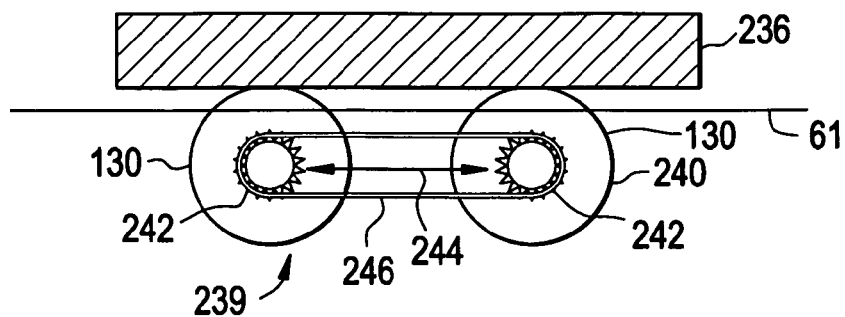
FIG. 17 is a partial cut-away view of roller assembly shown in FIG. 18.
Figure 18:
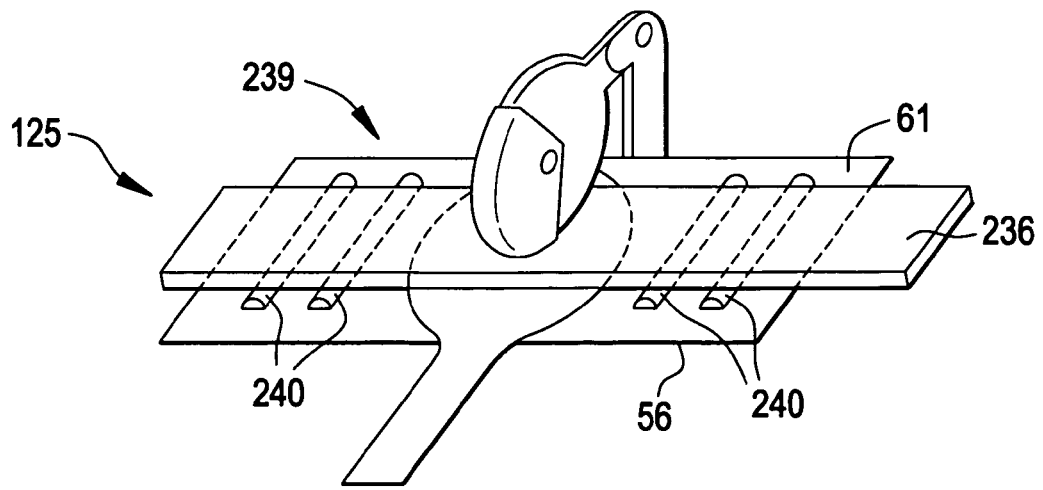
FIG. 18 is a partial perspective view of a roller assembly in a table for a miter box saw according to an embodiment of the invention.

FIGS. 17 and 18 illustrate roller systems 239 in accordance with some embodiments of the invention. The roller systems 239 shown in FIGS. 17 and 18 include linked rollers 240. The linked rollers 240 include a sprocket 242 on each roller 240, the sprockets having teeth 244. Connecting the sprockets 242 on the linked rollers 240 is a chain 246. The rollers 240 are locked in position when the workpiece 236 is in the desired location. In some embodiments of the invention, the rollers 240 are configured to be locked together to turn or not turn in unison. In other embodiments, the rollers 240 are not so locked.

Figure 17A:
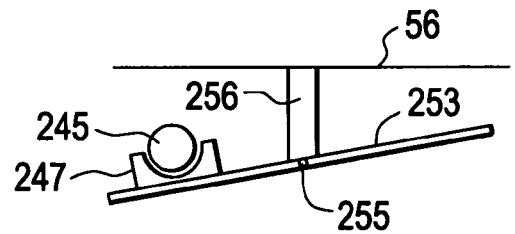
FIG. 17A is a partial cut away side view of a brake system for a roller in accordance with an embodiment of the invention.

Locking the rollers 240 can be achieved through numerous, standard methods employed to lock shafts from rotation. One such method, shown in FIG. 17A, would be to provide a lever 253 which, when operated by the user, would cause a brake element or a brake shoe 247 of the lever 253 to contact the roller 240, or the shaft 245 on which the roller 240 rides, perpendicular to the roller's surface to create a frictional interface that would resist movement of the roller 240. The lever 253 may pivot on a pivot pin 255 that pivotally attaches the lever 253 to a mounting bracket 256 mounted to the table 56.

Alternately the movement of the lever could be used to coaxially translate a cone shaped frictional element to contact a similarly shaped cone element located coaxially to the shaft or roller, and at the terminus of the shaft or roller 240.

Another method would have a "brake disc", coaxial with roller 240 and shaft, that would be clamped on by actuating a lever. This system could also employ hydraulic fluid to transfer the motion of the lever to the clamping mechanism.

The rollers 240 have a high friction coating to reduce the likelihood the workpiece 236 would move along the rollers 240 when the rollers 240 are in the locked position. The rollers 240 may be unlocked when it is desired to move the workpiece 236. When the rollers 240 are unlocked, the workpiece 236 may be manually moved to a desired position. Then the rollers 240 are locked in place.

FIG. 18 is a partial perspective view of a table assembly 125 having a roller assembly 239 as described with respect to FIG. 17. As shown, the workpiece 236, is mounted on the rollers 240 which are, in turn, located in the non-rotatable portion 61 of the table 56. In other embodiments in accordance with the invention, the rollers 240 may be located in roller boxes 152 attached to the table 56 (see FIG. 7 for example).

Figure 19:
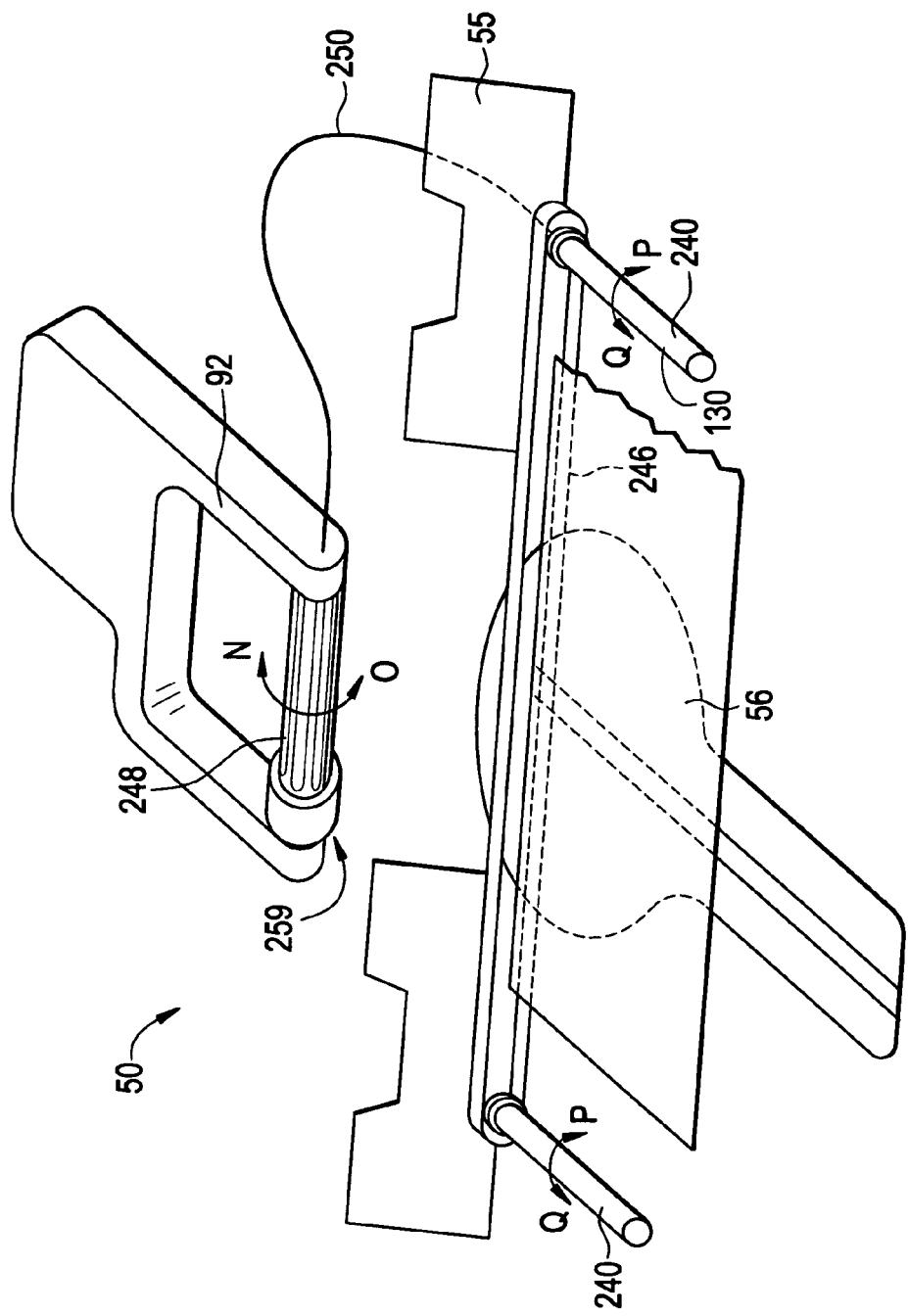
FIG. 19 is a partial perspective view of a miter box saw having a roller control located on an operating handle in accordance with an embodiment of the invention.

FIG. 19 is a partial view of a miter saw 50 in accordance with an embodiment of the invention. As shown in FIG. 19 the operating handle 92 is equipped with a motorcycle-type twist throttle 248 that can be twisted in two directions as illustrated by arrows N and O. The throttle-type control 248 is operatively connected by connecting line 250 to rollers 240. The rollers 240 can rotate clockwise or counterclockwise as illustrated as arrows P and Q. The rollers 240 are linked together by chain 246 similar to as discussed above with respect to FIGS. 17 and 18.

The connector 250 may be a mechanical connector such as a Bowden-type cable or other cable capable of transmitting force similar to that described with respect to FIG. 5 or it may be an electrical power and control cable where the rollers 240 are connected to an electric motor 158 similar to that described with respect to FIGS. 8 and 9. By articulating the motorcycle-type throttle control 248 in either direction N or O, the rollers 240 can move either in the P or Q direction. In some embodiments, not articulating the motorcycle-type throttle control at all 248, the rollers 240 remain in a locked position. In some embodiments of the invention, the rollers 240 are equipped with a high friction surface 130 in order to reduce the likelihood of a workpiece 236 from sliding along the rollers 240 when the rollers 240 are in the locked position.

Alternatively to the motorcycle-type throttle control 248, a rotatable actuation ring 259 on the handle 92 could actuate the rollers 240. Conventionally stated, a motorcycle-type twist throttle implies that the entire cylindrical handle 248 will be rotatable to actuate the workpiece feed rollers 240. By using a rotatable actuation ring 259 coaxial to the fixed handle, the actuation ring 259 only can be operated when it is desired that the rollers 240 be rotated. This allows a significant portion of the handle to remain fixed as a gripping surface. While FIG. 19 shows, for illustrative purposes, both a twist type throttle control 248 and a rotatable actuation ring 259 on the handle 92, most embodiments would have a twist type throttle control 248 or a rotatable actuation ring 259, but not both.

Figure 20:
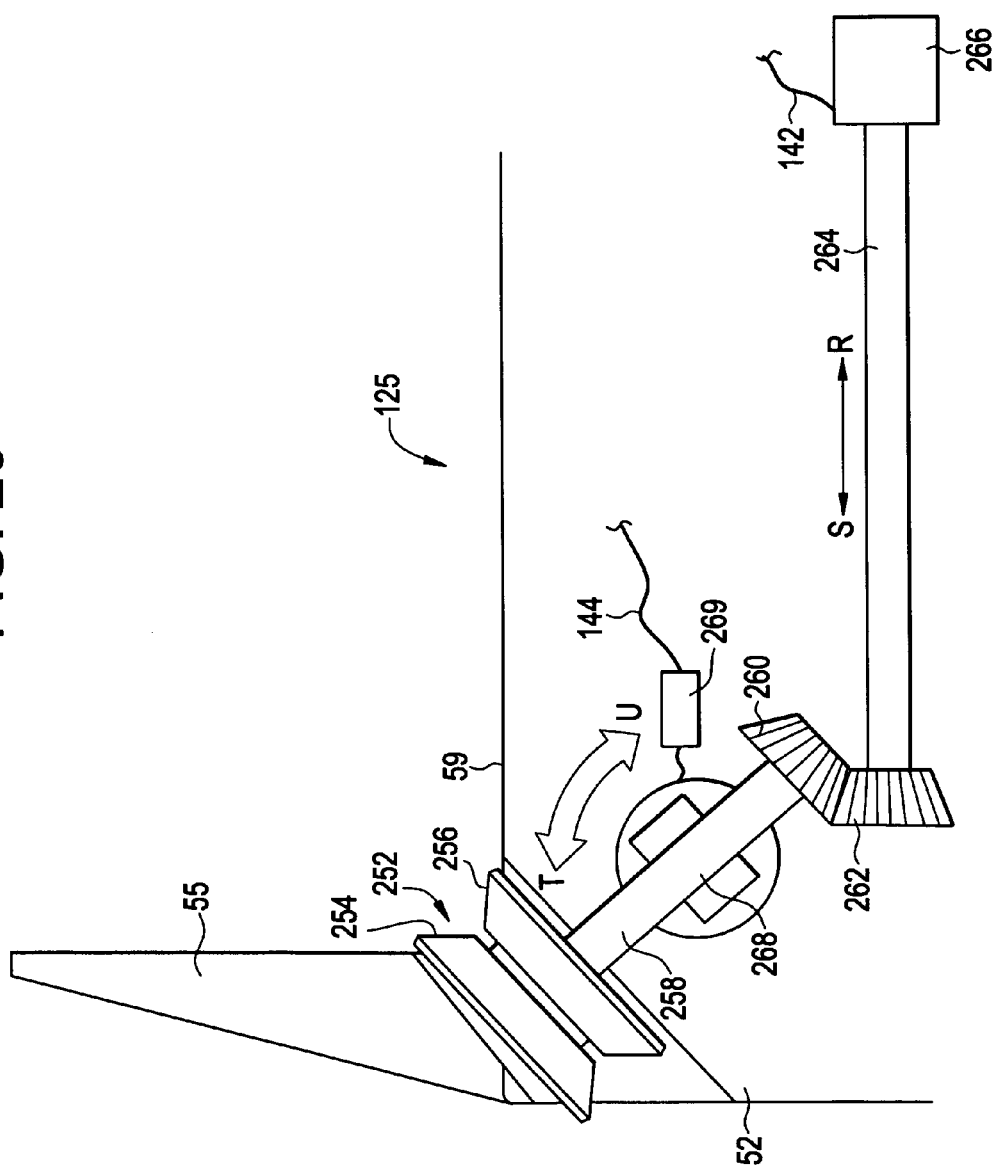
FIG. 20 is a partial side view of a table portion for a miter box saw according to an embodiment of the invention.

In FIG. 20, another table assembly 125 in accordance with the invention is shown. A diagonally oriented roller 252 includes a vertical surface 254 and horizontal surface 256. The vertical surface 254 is spaced slightly from the fence 55 and the horizontal surface 256 is spaced slightly from the surface 59 when the diagonal roller 252 is in the extended position. The diagonal roller 252 is mounted on a drive shaft 258 which is terminated with a bevel gear 260 which is meshed with a second beveled gear 262. The second beveled gear 262 is located on a drive shaft 264 which is operatively connected to motor 266. The drive shaft 264 could also be driven by a hand operated by a knob or handwheel type crank in other embodiments of the invention.

A pivoting bearing 268 engages the drive shaft 258. The pivoting bearing 268 is configured to pivot the drive shaft 258 in either a clockwise or counterclockwise direction as illustrated by arrows T and U. When the pivoting bearing 268 moves the drive shaft 258 in the direction of arrow T, the diagonal roller 252 will retreat to a position below flush from the fence 55 and the table surface 59.

When it is desired to use the diagonal roller 252, the pivoting bearing 268 will move in the direction of arrow U causing the beveled gear 260 to engage beveled gear 262. In another embodiment the bevel gears 260 and 262 remain engaged all the time. Drive shaft 264 is constrained to pivot bearing 268 by a separate bracket and deployment of diagonal roller 252 is done by rotating drive shaft assembly 264, 262, 260, 258 and 252 up and down.

Another embodiment where the bevel gears 260, 262 remain engaged but the bevel angle is variable similar to a constant velocity joint in a front wheel drive car. Deployment of diagonal roller 252 is done by pushing or pulling drive shaft 264 in direction S and R shown by arrows in FIG. 20.

The diagonal roller 252 can be controlled by a motor 266. When the diagonal roller 252 is in a retreated and below flush position, the beveled gear 260 is not in contact with beveled gear 262, and thus is not operatively connected to the motor 266.

In some embodiments of the invention, the pivoting bearing 268 may be actuated by a solenoid 269 or other suitable actuator. The solenoid 269 may be operatively connected to a cable 144 which is operatively connected to a control box 146 as shown and described in FIGS. 6 and 7. Likewise, the motor 266 may be operatively connected to a control box 146 via controls and power cable 142 as shown and described with respect to FIGS. 6 and 7. In other embodiments of the invention they may be connected to other types of control boxes.

Figure 21:
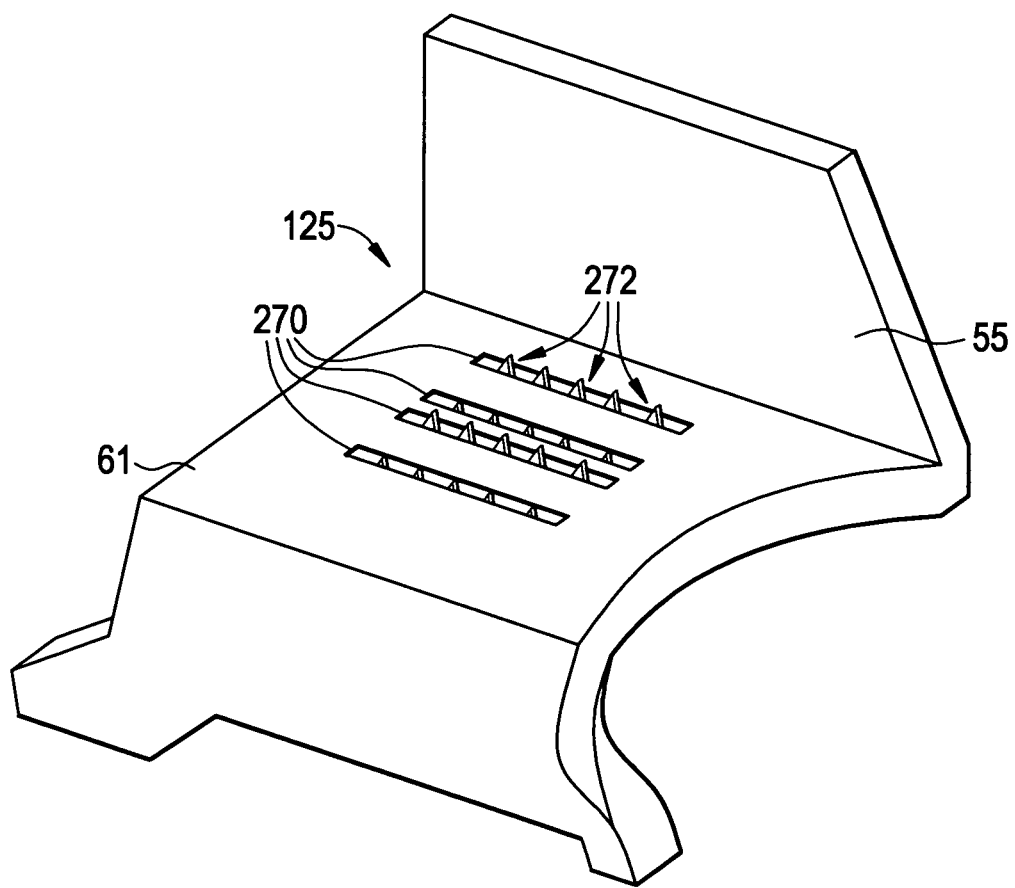
FIG. 21 is a partial perspective view of a table portion according to an embodiment of the invention.

FIG. 21 is a partial perspective view of a table assembly 125 in accordance with another embodiment of the invention. The table assembly 125 illustrated in FIG. 21 includes a fence 55 and stationary portion 61 of the table. The stationary portion of the table 61 has several slots 270. Teeth 272 can extend through the slots 270 to engage a workpiece. The teeth 272 can move laterally as controlled by the operator to engage a workpiece and move the workpiece to the right or to the left as controlled by the operator.

Figure 22:
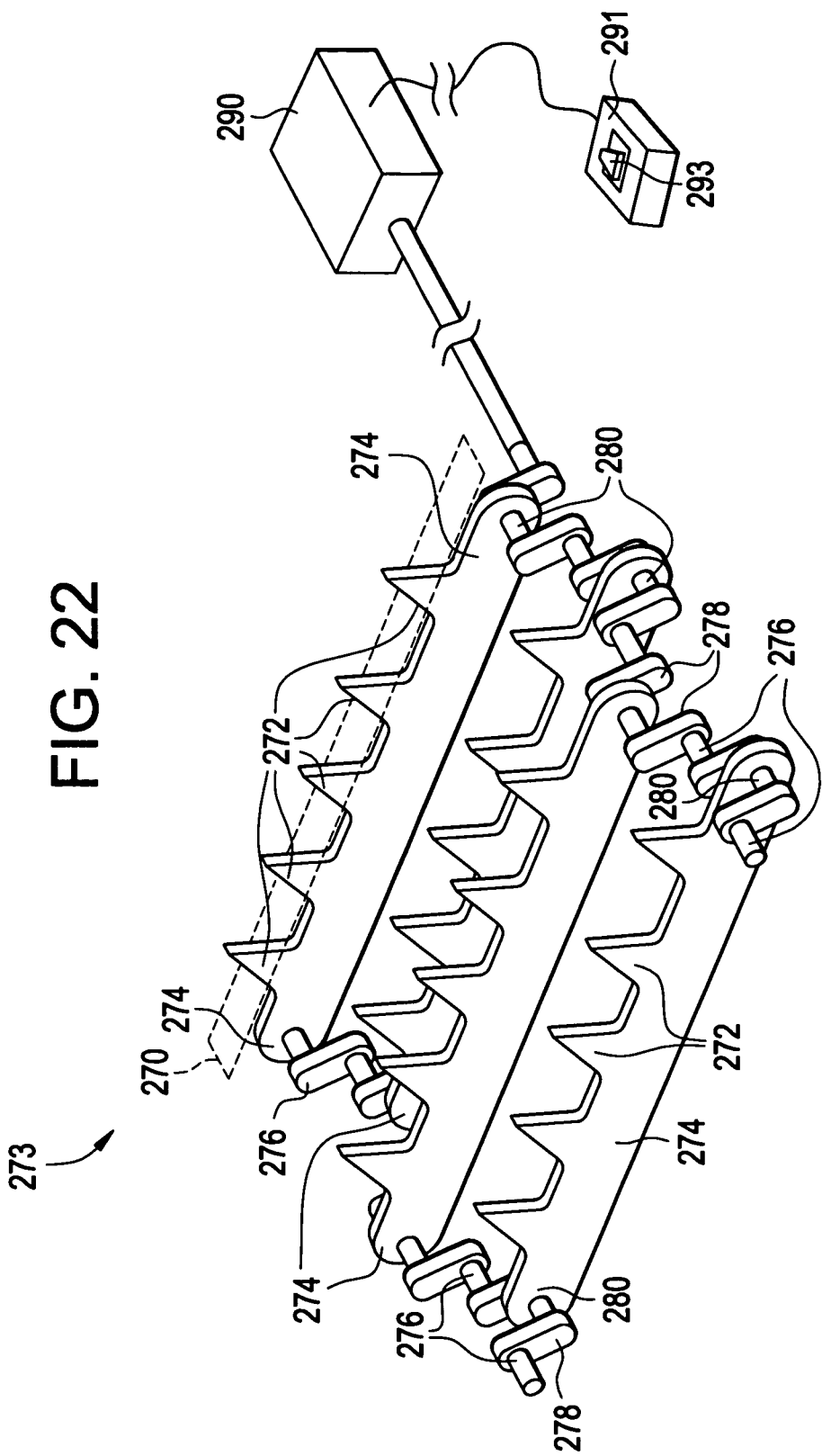
FIG. 22 is a partial perspective view of a workpiece moving assembly according to an embodiment of the invention shown in FIG. 21.

FIG. 22 illustrates the tooth assemblies 273. The tooth assemblies 273 include tooth plates 274. A multitude of tooth plates carrying teeth 272 are located on two shafts 276. The teeth plates 274 are not directly connected to the shafts 276, but are rather connected to axles 280 which are connected to the shafts by links 278.

When the shafts 276 rotate they cause the tooth plates 274 to move up and down as well as side to side. When the shafts 276 rotate counterclockwise, the tooth plates 274 starting from a down position will move up, then move to the left, then move down, and in the lowered position move to the right, then move up, then move left again. Thus, causing a workpiece located on the table assembly 125 to move to the left. When the shafts 276 rotate in the other direction, then a tooth plate 274 starting in the down position will move up, then to the right, then down, to the left, up, and to the right. The teeth 272 will engage a workpiece when the tooth plates 273 are in the up position, causing the workpiece to move to the right.

The teeth 272 and the tooth plates 274 operate in a similar manner as the teeth used to advance fabric being sewn with a sewing machine. In some embodiments of the invention, the shafts 276 are operatively connected to a motor 290 to rotate the shafts 276 selectively clockwise, counterclockwise or not at all. The motor 290 may be operatively connected to a switch 291 that is configured to control the motor 291. A stick-type actuator 293 may be moved left or right on the switch 291 to cause a signal to be sent to the motor 291 to cause the shaft 276 to be selectively rotated.

According to some embodiments of the invention, when the actuator 293 is moved to the left, the workpiece will be moved to the left. When the actuator 293 is moved to the right, the workpiece will be moved to the right. When the actuator 293 is in a center position (as shown in FIG. 22) the motor 290 does not turn the shaft 276. The switch 291 may be located on the operating handle 92 (see, for example, FIG. 1) similar to as described above with respect to other embodiments. The shafts 276 may also be manually turned with a handle in some embodiments in accordance with the invention.

Figure 23:
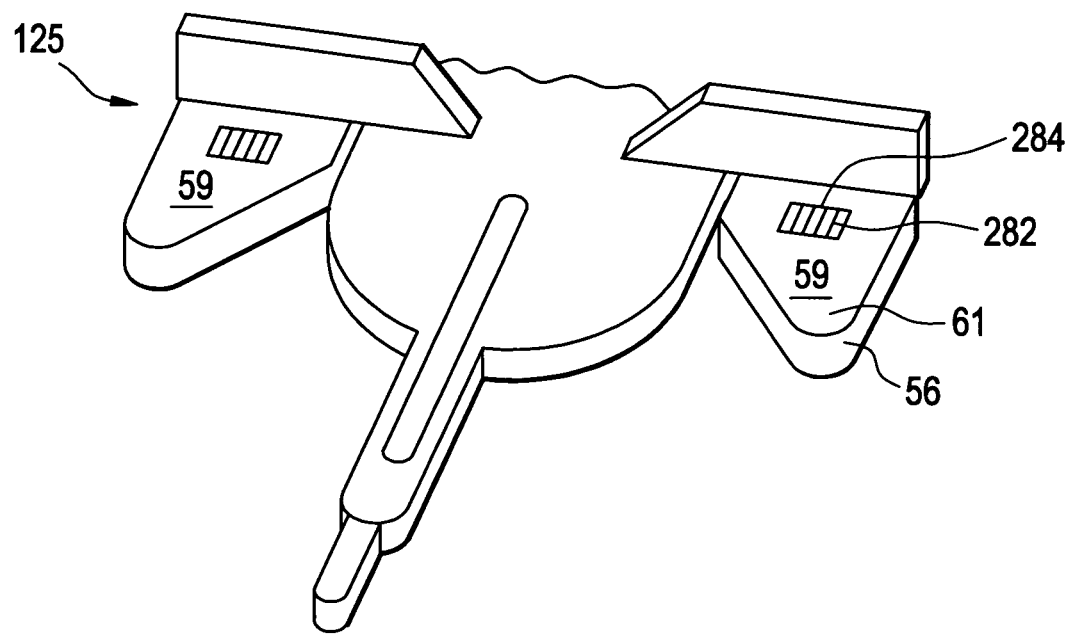
FIG. 23 is a partial perspective view of a miter box saw table portion according to an embodiment of the invention.

FIG. 23 illustrates a table assembly 125 in accordance with another embodiment of the invention. The table assembly 125 includes a moving block hole 284 located in a stationary portion 61 of the table 56. A moving block 282 can selectively extend into the moving block hole 284 to engage a workpiece and move it either to the left or to the right.

Figure 24:
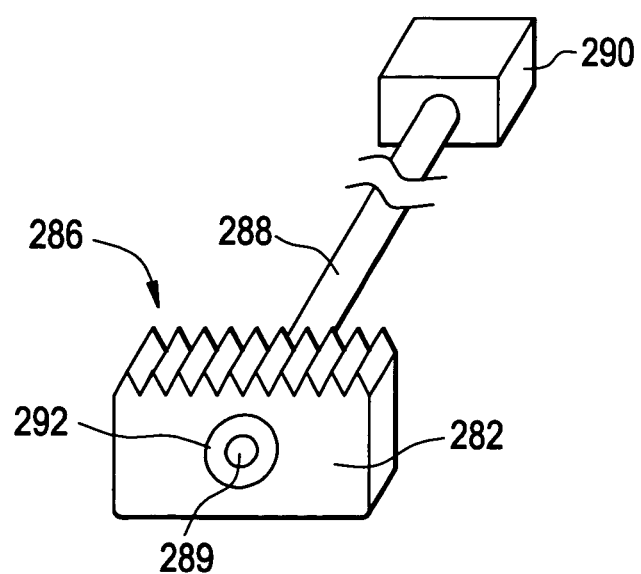
FIG. 24 is a partial perspective view of the workpiece moving device shown in the embodiment of FIG. 23.

FIG. 24 illustrates a moving block 282 that can be used in accordance with the embodiment shown in FIG. 23. The moving block 282 has teeth 286 located on the top part of the moving block 282. Teeth 286 are used to engage a workpiece located on the table 56 of a miter saw 50. The teeth 286 will engage the workpiece and by moving the moving block 282 either to the right or to the left when the moving block 282 is located above the surface 59 of the table 56, the workpiece will be moved to the right or to the left.

In order to move the moving block 282, a shaft 288 is operatively connected to a motor 290. An eccentric 289 mounted on the end of shaft 288 rotates within hole 292 inside block 282. Thus, when the shaft 288 rotates clockwise, block 282 will move up, to the right, down, to the left, and up to the right in a repeated manner similar in the eccentric motion described above with respect to FIGS. 21 and 22 to cause a workpiece to move to the right. Alternatively, if desired to move the workpiece to the left, the shaft 288 will be controlled by the motor 290 to move counterclockwise to move the block 282 up to the left, down, to the right, up, and to the left again.

Figure 25:
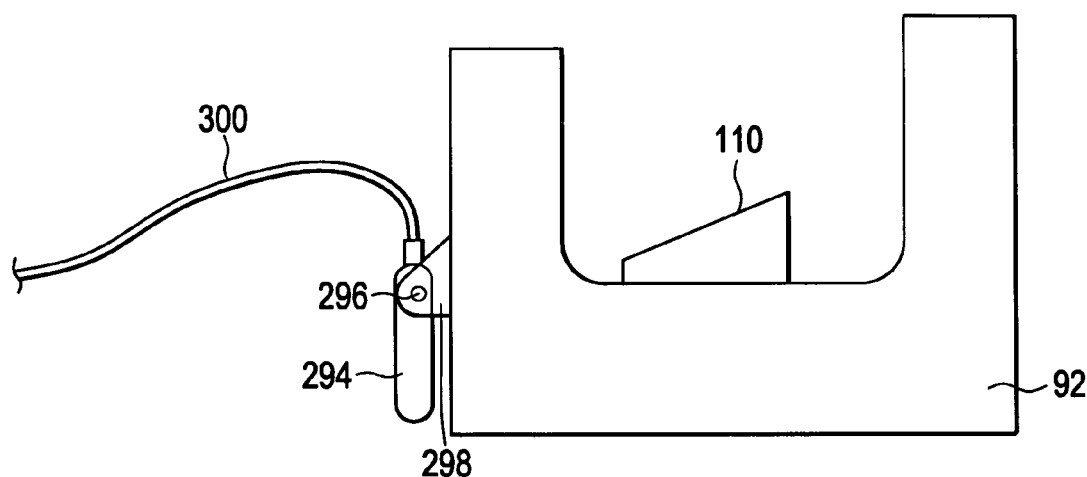
FIG. 25 is a top view of an operating handle for a miter saw according to an embodiment of the invention.

FIG. 25 is a top view of an operating handle 92 having a trigger switch 110. The operating handle 92 includes a thumb actuated lever 294. The thumb actuated lever 294 is connected to a lug 298 via a pivot pin 296. The lug 298 is connected to the operating handle 292. The thumb actuated lever 294 can pivot on the pivot pin 296 towards the operating handle 292. The thumb actuated lever 294 is located on the operating handle 92 in such a position that an operator having a hand on the operating handle 292 can easily actuate the lever 294 with the operator's thumb.

Actuating the lever 294 will control a mechanism (such as one described herein or an other suitable assembly) intended to move a workpiece located on a table assembly 125 of the miter saw either to the right or to the left.

Actuation of the operating handle 294 will move a control cable 300 operatively connected to a workpiece moving mechanism as described herein, whether it be a roller mechanism or one of the other mechanisms described herein. The cable 300 may be a force transporting cable such as a Bowden-type cable or any other cable capable of transmitting a force similar to that described with respect to FIG. 5, but distinguished from the embodiment shown in FIG. 5, rather than having a control box 136 located on a floor 140 with a circular actuator 138 operated by an operator's foot, instead the embodiment shown in FIGS. 25 and 26 use a thumb actuated lever 294 located on a handle 92 as used to actuate a workpiece moving mechanism.

Figure 26:
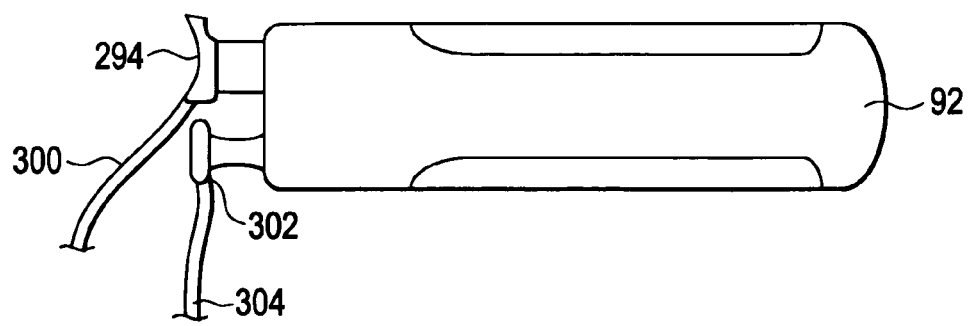
FIG. 26 is a side view of the operating handle illustrated in FIG. 25.

FIG. 26 illustrates the operating handle 92 as shown in FIG. 5 as a front view showing that two thumb actuated levers 294 and 302 can be used. Each thumb actuated lever 294 or 302 can be actuated to move a workpiece either in the right or left direction. For example, the lower thumb actuated handle 302, may be connected by a control cable 304 which may be a Bowden-type cable or similar type cable capable or transmitting mechanical force. Actuation of one lever 294 may cause a workpiece moving mechanism to move a workpiece to the right. Actuation of the other lever 302 may cause the workpiece moving mechanism to move a workpiece to the left. Of course the roles of the levers 294 and 302 could be reversed.

Figure 26A:
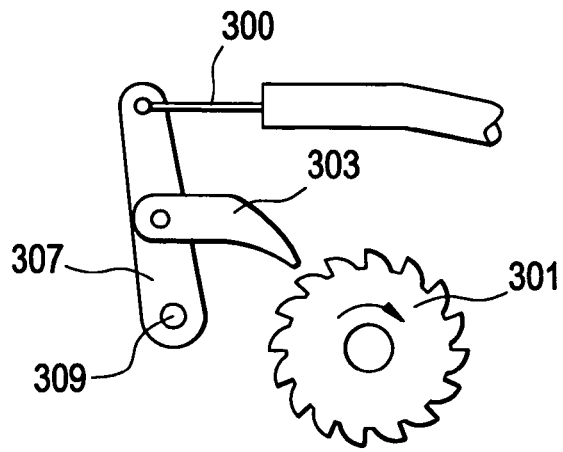
FIG. 26A is a partial side view of a ratcheting mechanism in a first position in accordance with an embodiment of the invention.

In some embodiments of the invention, the cables 300, 304 can be operatively connected to ratcheting mechanisms in rollers 128 located in the table assembly 125. As shown in FIG. 26A, a star wheel 301, pawl 303 and cable 300 are shown at rest. The cable 300 is connected to a pivot arm 307. The pivot arm 307 is pivotally connected to the frame 52 or other portion of the miter saw 50 via pivot pin 309. The pawl 303 is pivotally connected to the pivot arm 307. The star wheel 301 is connected to one of the rollers similar to roller 128 shown in various FIGS. contained in the table 56. The cable 300 is connected to the thumb lever 294 in its un-actuated position. The pawl 303 is not in contact with the star wheel 301 and therefore, the star wheel 301, and hence, the roller 128 (not shown in FIGS. 26A-26C but is shown in other FIGS.), is free to rotate in either direction.

Figure 26B:
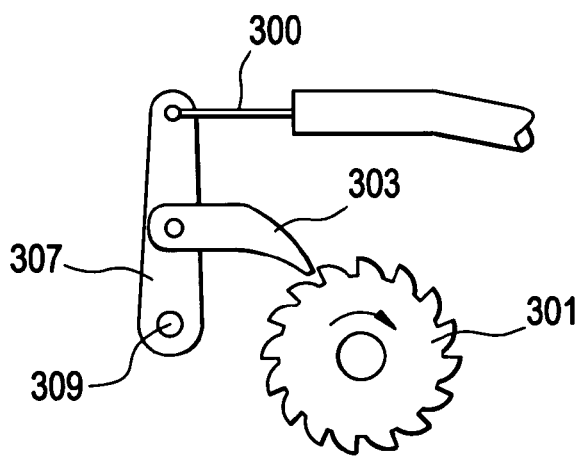
FIG. 26B is a partial side view of a ratcheting mechanism in a second position in accordance with an embodiment of the invention.
Figure 26C:
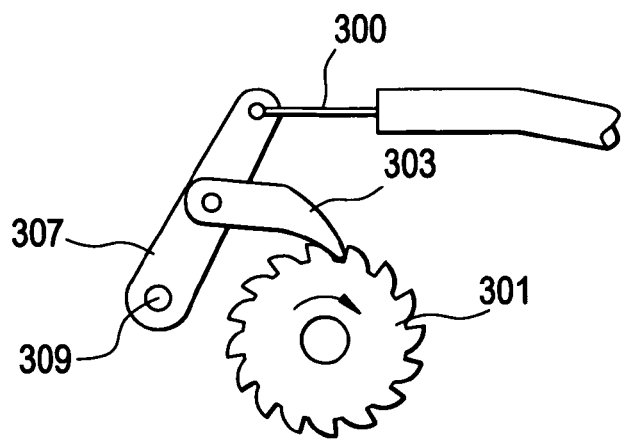
FIG. 26C is a partial side view of a ratcheting mechanism in a third position in accordance with an embodiment of the invention.

When the user actuates thumb lever 294, the initial movement of the cable 300 pulls the pawl 303 into contact with the star wheel 301, as shown in FIG. 26B. As the user continues to press thumb lever 294, the cable 300 pulls the pawl 303 further as seen in FIG. 26C, and thus forces the star wheel 301 and roller to rotate and hence, advance the workpiece. When the user releases thumb lever 294, the pawl 303 retracts and can reengage another tooth 305 in the star wheel 301, or if the user completely releases thumb lever 294, the pawl 303 will completely pull clear of the star wheel 301. The user can then press thumb lever 294 to further advance the workpiece if desired.

The cable 302 may be connected to a ratcheting mechanism configured to move the roller 128 in the opposite direction then described above. For example, cable 302 may be attached to a ratcheting mechanism configured opposite to that described above to cause a roller 128 to roll in the opposite direction as shown and described with respect to FIGS. 26A-C.

Alternatively, the cables 300 and 302 can be conductors and actuating the thumb actuated levers 294 and 302 can take the form of pushbuttons and can transmit a signal via the cables 300 and 304 respectively to electric motors similar to that which can actuate a workpiece to move to the right or to the left as described herein or according to other suitable systems. For example, the levers 294 and 302 can be used when the embodiments shown and described with respect to FIGS. 6 through 9, 20, 21 through 24, FIG. 33 described in more detail below and FIG. 34 described in more detail below. FIGS. 25 and 26 are not intended to be limited to any individual embodiment but rather illustrate different layouts for locating hand operated actuation devices in order to move a workpiece to the left or to the right on a table assembly 125.

Figure 27:
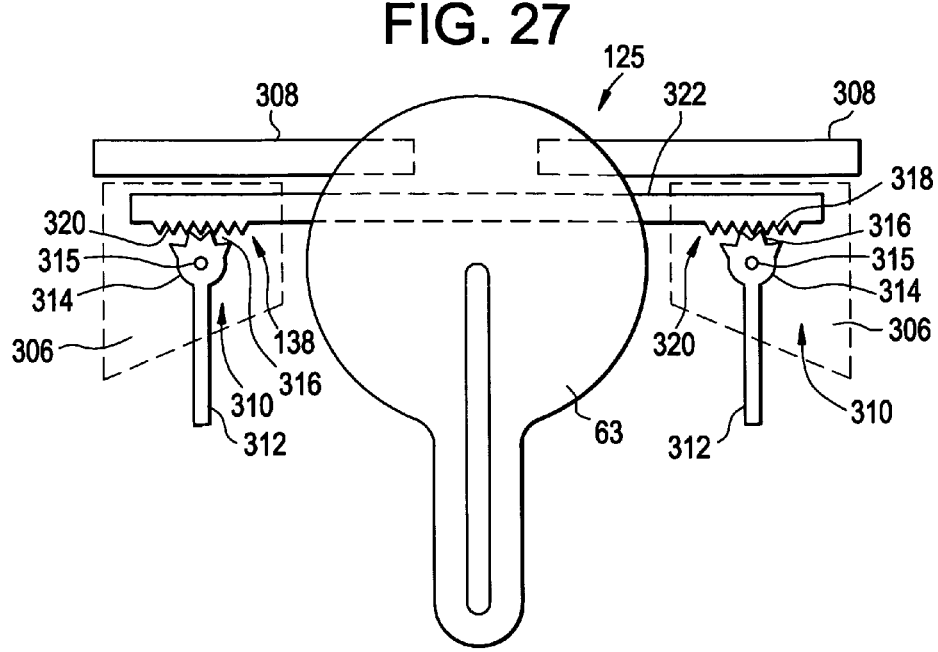
FIG. 27 is a top view of the table assembly for a miter box saw in accordance to an embodiment of the invention.
Figure 28:
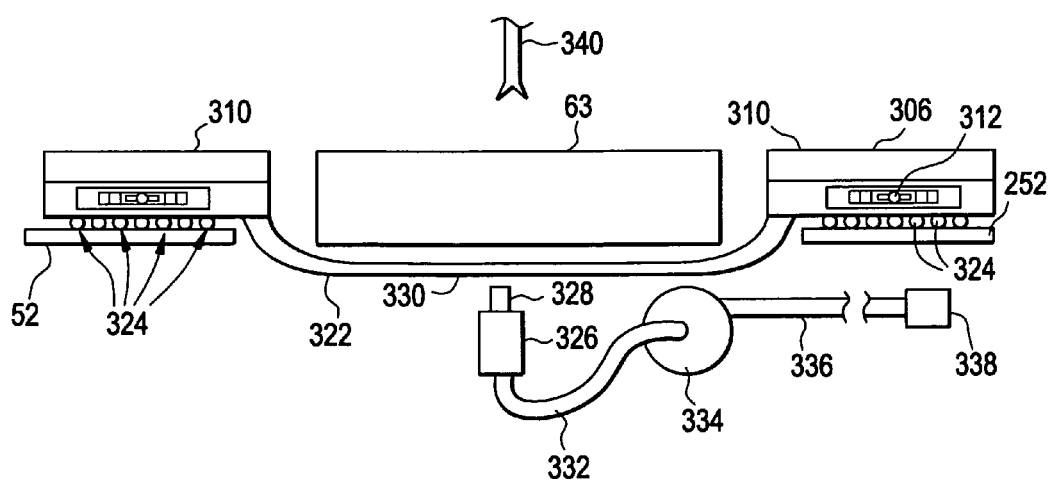
FIG. 28 is a side view of the table assembly for the miter saw shown in FIG. 27.

Turning now to FIGS. 27 and 28, another embodiment in accordance with the invention is shown. FIG. 27 is a partial top view of a table assembly 125. The embodiment shown in FIGS. 27 and 28 incorporate a moving table 306 where the moving portion 306 is located on either side of the rotating portion 63 of the table 56 which does not move laterally but rather rotates as described above.

Parts of the moving table 306 is shown in FIG. 27 in phantom lines are drawn as "see through" objects in order to better illustrate structure located below the top surface of the moving table 306. The moving table 306 may also include a moving fence 308 that is mounted to the moving table 306 so that when the moving table 306 moves to the right or to the left the moving fence 308 will also move to the right or to the left.

In some embodiments of the invention, a high friction surface 310 is located on the moving table 306. Thus, when a workpiece is placed on the moving table 306 it is engaged with a relatively high friction surface so when the moving table 306 moves to the right or to the left the workpiece will also move to the right or to the left.

To move the moving table 306 to the left or to the right a set of levers 312 is used. The levers 312 terminate at one end with a pinion 314. The pinion 314 is located on a pivot axle 315. The pinion 314 may be integral with the lever 312 as illustrated in FIG. 27. In other embodiments of the invention, the pinion 314 may be connected to the lever 312 but not necessarily integral with the lever 312.

The pinion 314 has teeth 316 that are engaged with a rack 318 which has teeth 320. The rack 318 is integral with, or in some embodiments of the invention connected to, a moving portion of the table 306 so that when one or both of the levers 312 are moved to the right the teeth 316 on the pinion 314 will engage the teeth 320 on the rack 318 and move the moving portion 306 of the table 306 to the left. Generally the table 306 will move in the opposite direction then what the lever 312 has been moved.

The levers 312 are located so that they can be moved by an operator's hand. The levers 312 can also be moved by other body parts such as a leg or a knee if the operator's hands are busy engaging the operating handle 92 of the saw or securing a workpiece mount located on the table 306.

A connecting bar 322 connects both portions of the moving table 306 located on either side of the rotating portion 63 of the table. The moving table 306 may be mounted on bearings 324 in order to facilitate movement of the moving portion of the table 306 on the frame 52 as illustrated in FIG. 28.

In order to operate the table assembly shown in FIGS. 27 and 28, an operator can move either lever 312 to move the table 306.

Once the workpiece is in a desired position, the moving portion of the table 306 can be secured in place. As shown in FIG. 28, a solenoid 326 can operate a brake 328. The brake 328 can extend up and engage a braking surface 330 located on the connecting bar 322. This securing function of the solenoid 326 and the brake 328 help keep the moving table 306 in place so that when the blade 340 cuts a workpiece the workpiece and/or moving portion of the table 306 will be resistant to move laterally.

The solenoid 326 may be operatively connected via a control wire 332 to a controller 334. The controller 334 will control the solenoid valve 326 to operate the brake 328 to extend up to engage the braking surface 338 or to go down and disengage with the braking surface 330. The controller 334 may be operatively connected via a connecting wire 336 to a saw power switch 338, so that in some embodiments of the invention, when the blade 340 rotates because it has been given power via a power switch 338, a signal may be sent to the controller 334 via the conductor 336 to automatically engage the brake 328 with the engaging surface 330. In some embodiments of the invention, whenever the saw blade 340 is rotating, the brake 328 will be engaged through the engaging surface 330 so that the workpiece will be in a secure position. The controller 334 may also be operatively connected to a position switch or motion sensor to ensure the brake 328 is engaged when the blade 340 rotates.

Figure 29:
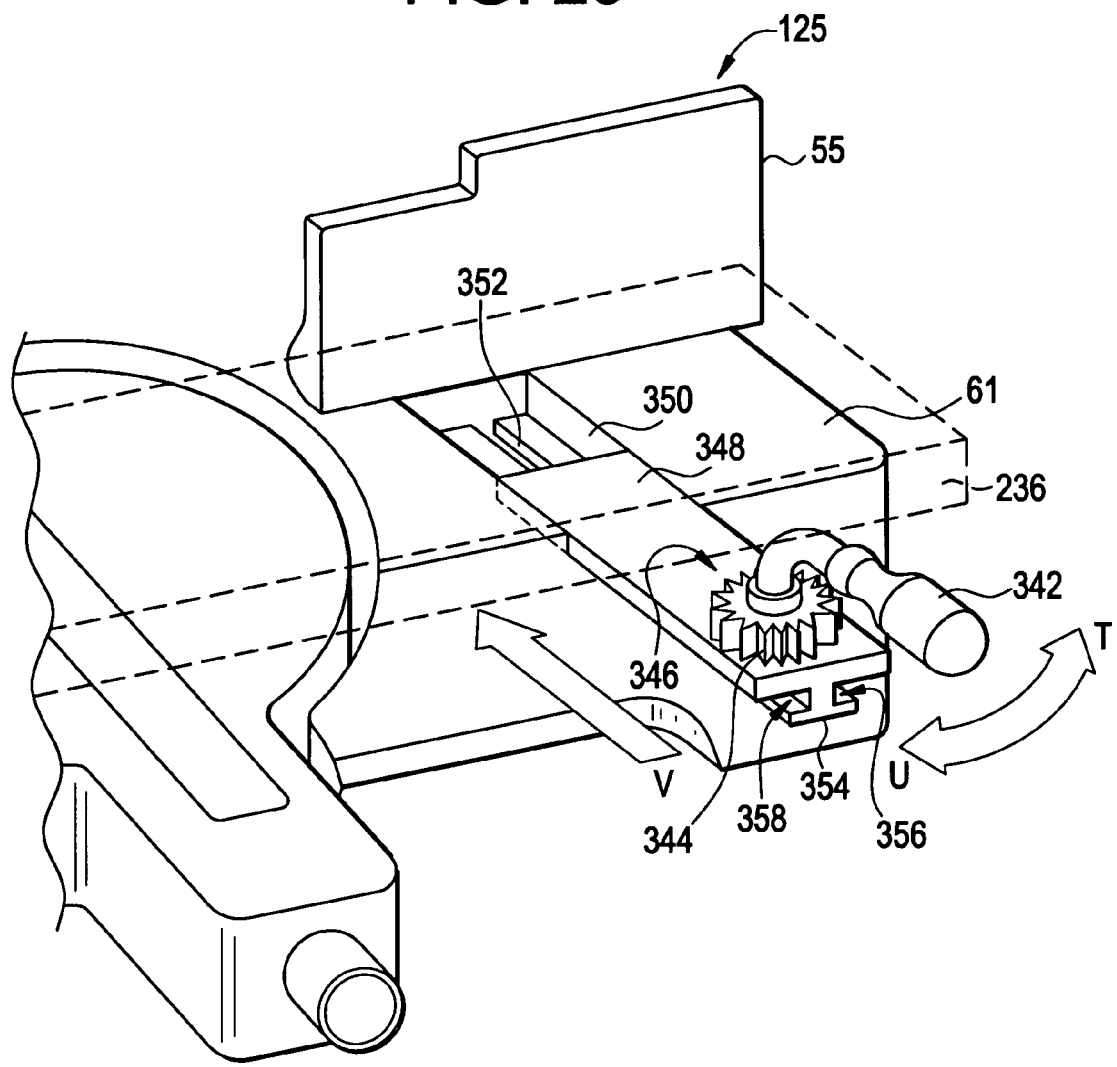
FIG. 29 is a partial perspective view of a table assembly for a miter saw according to an embodiment of the invention.

FIG. 29 illustrates a partial view of a table assembly 125 in accordance with another embodiment of the invention. The table assembly 125 includes a sliding plate 348 that is configured to slide in the direction illustrated by arrow V and in a direction opposite to that shown by arrow V. The sliding plate 348 can slide along the sliding plate receiving slot 350 located on the non-moveable portion 61 of the table assembly 125. The sliding plate 348 is configured to slide within a sliding groove 352. A sliding tongue 354 has two sliding slots 356 and 358 which allow the sliding tongue 354 to fit in the sliding groove 352.

Mounted on the sliding plate 358 is a roller handle 342 operatively connected to an engaging roller 344. The roller handle 342 is configured to pivot as indicated by arrows labeled T and U. The pivoting of the roller handle 342 will cause the engaging roller 344 to rotate along with the roller handle 342.

The engaging roller 344 is equipped with engaging teeth 346. The engaging teeth 346 engage a workpiece 236 that is located on the table assembly 125. To operate the roller handle 342 of FIG. 29, the roller handle 342 can be pushed in direction V or pulled away from the fence 55 in the direction opposite to the arrow indicated V in order for the workpiece 236 to fit between the engaging roller 344 and the fence 55. Once the workpiece 236 is in place then the roller handle 342 can be moved in the direction indicated by arrow V so that the engaging teeth 346 engage the workpiece 236. Then, the workpiece 236 can be moved to the desired position by an operator operating the roller handle 342.

When the workpiece 236 is located between the fence 55 and the engaging roller 344. When the roller handle 342 is actuated in either direction T or U the workpiece 236 will slide laterally along the table assembly 125. For example, when the roller handle 342 is moved in direction T, the workpiece 236 will slide to the left. Roller handle 342 is moved in direction U, the workpiece 236 will move to the right.

The engaging teeth 346 and/or engaging roller 344 may be ferrous or aluminum or of a more resilient material such as rubber such that it will engage the workpiece 236 which is usually made of wood, with a sufficient high friction way to cause the workpiece 236 to slide along the table assembly 125 when the engaging roller 344 is rotating.

Figure 30:
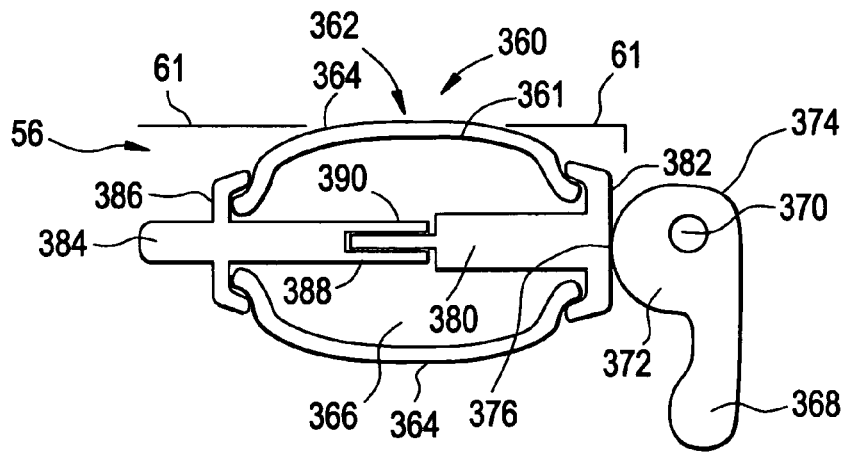
FIG. 30 is a cut-away side view of a roller assembly for a miter saw according to an embodiment of the invention.
Figure 31:
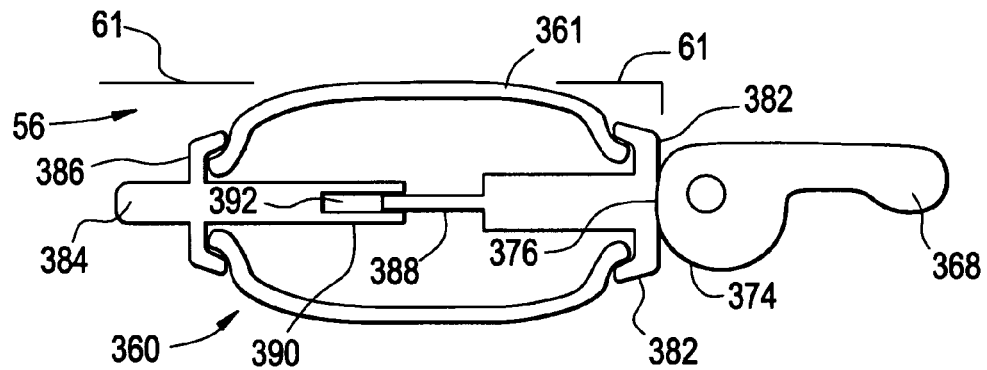
FIG. 31 is a cut-away side view of the roller assembly shown in FIG. 30 where an adjusting lever is in another position causing the roller to be in an uncompressed condition.

FIGS. 30 and 31 illustrate a resilient roller assembly 360 in accordance with another embodiment of the invention. The resilient roller assembly 360 includes a portion 362 of the roller 361 that extends above the surface 59 of the non-moveable portion 61 of the table. As shown in FIG. 31, the roller 361 can also take a shape such that no part of the roller 361 extends above the top surface 59 of the non-moveable portion 61 of the table 56.

The resilient roller assembly 360 shown in FIGS. 30 and 31 include the roller 361 having a roller surface 364. The roller 361 may be made of a resilient material 366 such that the resilient material 366 is biased to take the shape as shown in FIG. 31 where no portion of the roller 361 extends above the surface 59 of the non-moving portion 61 of the table 56.

The roller 361 can be compressed in axial compression and may bulge or take a barrel shape as shown in FIG. 30, thus causing part 362 of the roller 361 to extend upward and above the surface 59 of the non-moving portion 61 of the table 56. When the roller 361 takes on a barrel shape as indicated in FIG. 30, the roller 361 can engage a workpiece sitting the non-moveable portion 61 of the table 56.

To cause the roller 361 to be compressed and take on the barrel shape shown in FIG. 30 a lever 368 is provided. The lever 368 pivots on a pivot pin 370 connected to a lug to the frame 52. The lever 368 includes a large portion of a cam 372 and smaller dimensioned portion of the cam 371. The large portion of the cam 372 has a larger radius between the edge of the cam surface and the pivot pin 370 than does the small portion of the cam 374 as indicated in the drawings. When the lever 368 takes the position as indicated in FIG. 30, the large portion of the cam 372 is engaged with the camming surface 376 of the wheel hub 380. In other embodiments of the invention, rather than using a cam system, the roller 361 may be compressed by actuating a screw. Other suitable compression systems may also be used.

The wheel hub 380 includes flange 382 which hold securely the roller 361 and the roller surface 364. The flange 382 also apply compression to the roller 361 causing it to take the barrel shape as shown in FIG. 30 when the lever 368 is in the position as indicated in FIG. 30.

The lever 368 can be moved to achieve a position as indicated in FIG. 31. When the lever 368 is moved to a position as indicated in FIG. 31, the resilient nature of the roller 361 will cause the roller 361 to relax and take a more cylindrical shape and not have any portion protrude from the surface of the non-moving portion of the table 61.

The roller assembly 360 also includes a second wheel hub 384 having its own flange 386 which like the flange 382 contain the roller 361 and roller surface 364. The wheel hub 384, like wheel hub 380, provides an axle upon which the roller 361 can rotate. The wheel hubs 380 and 384 can change axial length by means of a guiding shaft 388 fitting within a receiving slot 390. When the lever 368 takes the position as shown in FIG. 30, the guiding shaft 388 extends more fully into the receiving slot 390 then when the lever 368 takes the position as shown in FIG. 31. As shown in FIG. 31, the guiding shaft 388 is extended out of the receiving slot 390 creating a space 392 within the receiving slot 390.

In some embodiments of the invention, once the lever 368 takes the barrel shaped position as indicated in FIG. 30, the lever 368 can then be rotated to cause the roller 361 to rotate. Rotating the roller 361 will also cause a workpiece sitting on the non-moveable portion 61 of the table 56 to move in response to movement of the roller 361. Rotating the lever 368 about the axis of the wheel hub 384 will cause a workpiece to move.

Figure 32:
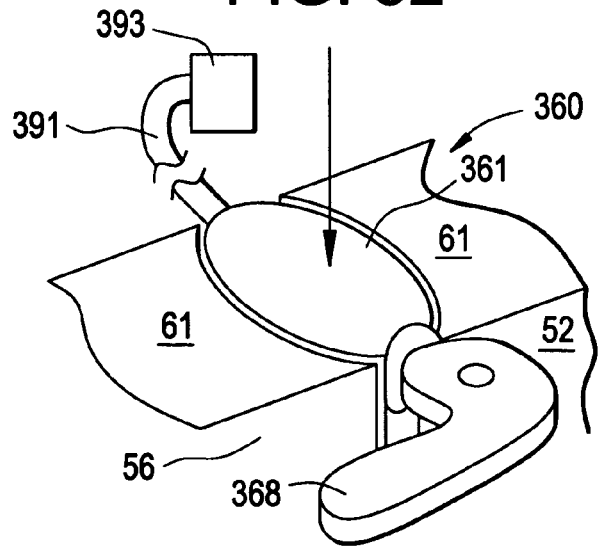
FIG. 32 is a partial perspective view of an inflatable roller assembly.

In another embodiment of the invention, as illustrated in FIG. 32, similar to the embodiments illustrated in FIGS. 30 and 31, a resilient roller assembly 360 is made to be inflatable. When the roller 361 is desired to take on a barrel shape similar to that shown in FIG. 30, an air supply 393 is activated and provides air via conduit 391 to an interior portion of the roller 361 to inflate the roller so that it takes on a barrel shape similar to that shown in FIG. 30. When inflated, a portion 362 extends above the surface 59 of the non-moveable portion 61 of the table 56. When the roller 361 has taken on this barrel shape and extends above the surface 59 of the non-moveable portion 61 of the table 56, it engages a workpiece that may be placed upon the table 56.

Rotating the handle 368 can actuate the roller 361 similar to as described with respect to FIGS. 30 and 31. Therefore, an operator can move a workpiece by rotating the handle 368. When it is desired for the roller 361 to no longer be inflated, then the air source 393 can be deactivated and allowing the air within the roller 361 to exit via a conduit 391, thereby causing the roller 361 to take a shape as indicated in FIG. 31.

In some embodiments of the invention the handle 368 is operatively connected to the air supply 343 with appropriate valving so that when the handle 368 is in the position shown in FIG. 32, the roller 361 is inflated. When the handle 368 is in a position similar to that shown in FIG. 31, the roller 361 deflates.

Air may supplied to the roller 361 by having the wheel hub 380 or 384 having an air tight swivel connection on one end (similar to an air compressor hose reel) to connect the air supply.

Figure 33:
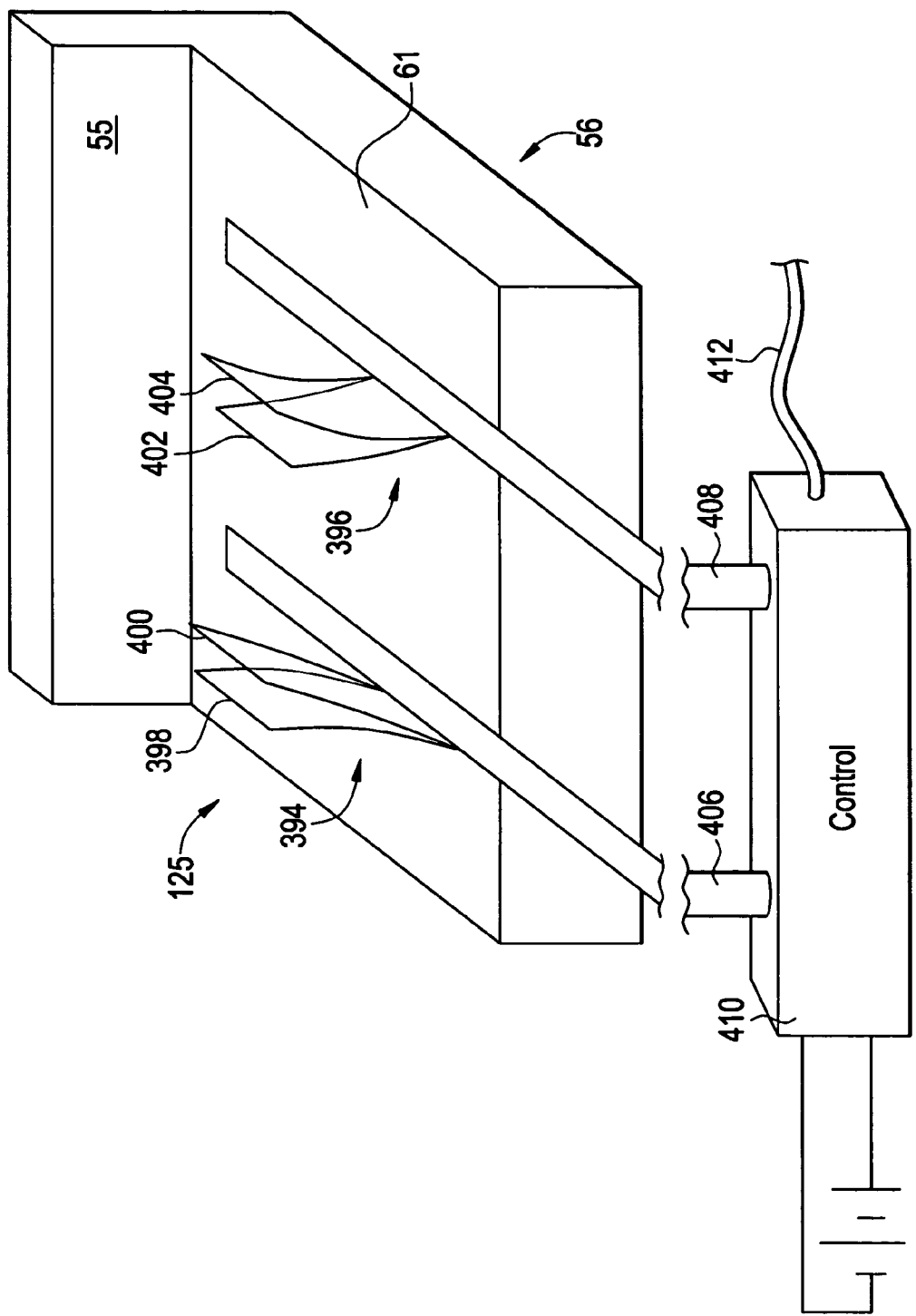
FIG. 33 is a partial perspective view of a table assembly for a miter saw according to an embodiment of the invention.

FIG. 33 illustrates a portion of a table assembly 125 in accordance with another embodiment of the invention. As illustrated in FIG. 33, memory metal fingers 394 and 396 are located on the non-moving portion 61 of the table 56. The metal memory fingers 394 and 396 are operatively connected via conductors 406 and 408 to a control 410. The control 410 can selectively provide current to the metal memory fingers 394 and 396 to cause them to be resistively heated to different temperatures. The different temperatures can cause the memory metal fingers 394 and 396 to achieve different positions.

For example, there is a first memory position 398 for memory metal finger 394 and there is a second position 400 for memory metal finger 394. Likewise, for memory metal finger 396 a first position 402 is associated with a certain temperature, and a second position 404 is associated with a second temperature. By selectively controlling the temperatures of the memory metal fingers 394 and 396 by heating the memory metal fingers 394 and 396 with the controller 410, the metal memory fingers 394 and 396 can be moved in a select pattern that will cause a workpiece located on top of the memory metal fingers 394 and 396 on the non-moveable portion of the table 61 to be moved either to the left or to the right.

The memory alloy metal can remember two predetermined shapes and is triggered to remember these shapes by being heated or cooled to certain temperatures. The controller 410 provides an electric circuit that provides current to the legs 394 and 396 to alternately heat and cool the fingers 394, 396. In some embodiments of the invention, two sets of fingers 394, 396 are used. One set to move a workpiece left and a second set to move a workpiece right. The controller 410 can control both sets. An example of memory metal that could be used in accordance with the invention is Nitinol. Other suitable materials could also be used.

The metal memory fingers 394 and 396 are shown in exaggerated length for clarity, but would in many embodiments be much smaller and then as illustrated.

The control 410 can be operatively connected via conduit 412 to a control input device for operation via user in order for a user to indicate whether a workpiece is desired to be moved to the right or to the left. Such an input device may be any input device suitable or similar to that as described above with respect to other embodiments where a user input device is used to control movement of the workpiece to the right or to the left.

Figure 34:
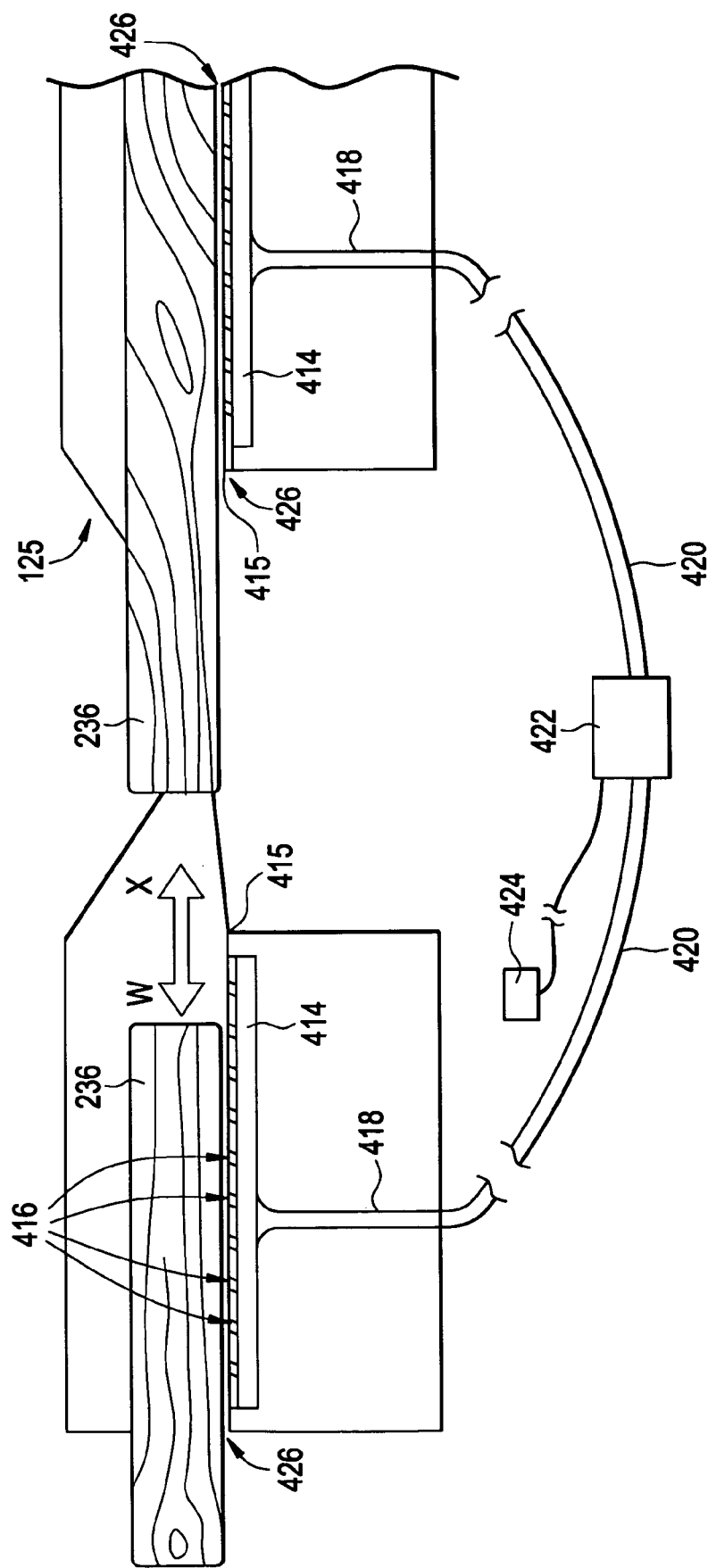
FIG. 34 is a partial side view of a table assembly for a miter saw according to an embodiment of the invention.

FIG. 34 illustrates another embodiment of a table assembly 125 for a miter saw in accordance with the invention. In the embodiment illustrated in FIG. 34, the workpiece 236 can be moved to the right or to the left as indicated by arrows labeled W or X by riding upon a cushion of air 426 similar to how an air hockey puck for an air hockey game rides upon a cushion of air on top of a table.

The table assembly 125 shown in FIG. 34 includes air chambers 414. Fluid communication between the air chamber 414 and a top surface 415 of the table assembly 125 is provided by holes 416 in the table top. These holes 416 are similar to those found in an air hockey table. Air is provided to the air chamber 414 via conduits 418 in the table assembly 125. The conduits 418 are operatively connected to air hoses 420 which in turn is operatively connected to an air source or an air pump 422.

The air pump or air source 422 is operatively connected to a switch 424 which may be controlled by an operator of the miter saw to selectively provide a cushion of air 426 between the workpiece 236 and the top surface of the table 415.

When the cushion of air 426 is provided, then the workpiece 236 can be moved by an operator in the direction of the arrows W or Y more easily. When it is time to cut the workpiece, the operator can turn off the air supply by either actuating the switch 424 or the air supply may be automatically turned off when the fan blade starts to rotate similar to that described with one of the other embodiments described above.

When the air source 422 is turned off, and the cushion of air 426 dissipates and the workpiece 236 will come to rest on the top surface 415 of the table assembly 125. In some embodiments of the invention, the top surface 415 may be a relatively high friction surface in order to allow the workpiece 236 to resist movement once then cushion of air 426 is no longer provided.

By actuating the switch 424 and turning on the air source 422 which may be, in some embodiments of the invention, an air compressor, air supplied through the air hose 420 through the conduits 418 to the air chamber 414 and will go through the holes 416 in the table assembly 125 to provide the cushion of air 426 which will lift the workpiece 236. An operator can then easily move the workpiece 236 in the direction of arrows W or X as desired. Once the final position of the workpiece 236 is achieved, the operator can then disable the air source 422 bringing the workpiece 236 to rest on the top surface of the table 415 in the desired position, and then the operator can then cut the workpiece 236.

In some embodiments of the invention, when the workpiece 236 is in the desired position, the switch 424 can be actuated to reverse operation of the air pump 422 to turn it to a vacuum. Air is drawn through the holes 416 into the air chamber 414. This creates a suction between the workpiece 236 and the table top surface 415. This suction will draw the workpiece 236 to the table top surface 415 and hold the workpiece securely for cutting.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A manually operated miter saw comprising:
   a horizontally disposed table for supporting a workpiece;
   a vertically disposed fence located adjacent to the table and defining a fence plane;
   a motorized saw blade mounted on a movable support having a handle for manually moving the saw blade into engagement with a workpiece to perform a cutting operation on the workpiece, the saw blade defining a cutting plane; and
   a workpiece adjusting mechanism for adjusting the position of a workpiece manually placed on the table relative to said cutting plane, said workpiece adjusting mechanism comprising:
   an engager for engaging the workpiece, the engager configured to selectively move the workpiece with respect to the table in either a first direction or a second opposite direction that is generally transverse to said cutting plane and parallel to said fence plane; and
   an actuator configured to control the engager to selectively control both the amount and direction of movement of the workpiece by the engager, to thereby adjust the position of the workpiece with respect to the cutting plane of said saw blade.

2. The miter saw of claim 1, wherein the engager is a roller.

3. The miter saw of claim 2, wherein the actuator is configured to control the direction of rotation of the roller.

4. The miter saw of claim 3, wherein the actuator is further configured to control the degree of rotation of the roller.

5. The miter saw of claim 4, wherein the actuator is located beneath the table and configured to be operated by one of a user's leg and foot.

6. The miter saw of claim 4, wherein the actuator is manually operated.

7. The workpiece adjusting mechanism for the miter saw of claim 1, further comprising an activator mechanism configured to move the engager between an engaged position where the engager engages a workpiece and a disengaged position where the engager is not engaged with the workpiece.

8. A workpiece adjusting mechanism for the miter saw of claim 7, wherein at least one of the engager and the activator mechanism is manually operated.

9. A workpiece adjusting mechanism for the miter saw of claim 7, wherein at least one of the engager and the activator mechanism is electronically operated.

10. A workpiece adjusting mechanism for the miter saw of claim 7, further comprising a recess defined, at least in part, by the table and the engager extends through the recess in the table when the engager is in the engaged position and the engager is retracted into the recess when the engager is in the disengaged position.

11. A workpiece adjusting mechanism for the miter saw of claim 7, further comprising:
    the fence for guiding the workpiece; and
    a recess defined, at least in part, by the fence and the engager extends through the recess in the fence when the engager is in the engaged position and the engager is retracted into the recess when the engager is in the disengaged position.

12. A workpiece adjusting mechanism for the miter saw of claim 11, further comprising a recess defined, at least in part, by the table and the fence and the engager extends through the recess when the engager is in the engaged position and the engager is retracted into the recess when the engager is in the disengaged position.

13. The miter saw of claim 1, further comprising a high friction surface located on a portion of the engager, the high friction surface configured to engage the workpiece with one of a rough surface and a resilient surface.

14. The miter saw of claim 1, wherein the engager includes a plurality of rollers.

15. A workpiece adjusting mechanism for the miter saw of claim 14, further comprising a linkage configured to link the rollers to roll in a synchronized manner.

16. A workpiece adjusting mechanism for the miter saw of claim 1, further comprising teeth on the engager for engaging the workpiece.

17. A workpiece adjusting mechanism for the miter saw of claim 1, further comprising one of a position-sensitive switch and a pressure sensitive switch located in the actuator and configured to vary the speed the engager moves the workpiece with respect to the table depending upon the position of the switch when a position-sensitive switch is used and the pressure applied to the switch when a pressure-sensitive switch is used.

18. A workpiece adjusting mechanism for the miter saw of claim 1, further comprising the handle having a switch operatively connected to the saw blade associated with the miter saw, wherein the actuator is located on the handle proximate to the switch to allow a user's hand, when gripping the handle, to operate the switch and the actuator.

19. A workpiece adjusting mechanism for the miter saw of claim 1, wherein the engager includes two memory metal fingers, the memory metal fingers operatively connected to the actuator to be heated to various temperatures, the memory metal fingers configured to achieve different position depending upon the temperature they are heated to and move the workpiece as the memory metal fingers are heated.

20. The miter saw of claim 1, wherein the engager is further configured to move in a generally vertical direction to selectively engage the underside of the workpiece.

21. The miter saw of claim 1, wherein the actuator is manually operated.

22. The workpiece adjusting mechanism for the miter saw of claim 1, further comprising a recess defined, at least in part, by the table, and wherein the engager extends through the recess in the table to engage the underside of a workpiece.

23. The workpiece adjusting mechanism for the miter saw of claim 22, wherein the engager only extends slightly above the surface of the table to frictionally engage the underside of the workpiece sufficiently to move the workpiece in either of said first or second direction.

* * * * *